(12) United States Patent
Onda

(10) Patent No.: US 9,400,523 B2
(45) Date of Patent: Jul. 26, 2016

(54) INFORMATION DEVICE

(71) Applicant: FUJITSU LIMITED, Kawasaki-shi, Kanagawa (JP)

(72) Inventor: Nobuhiko Onda, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 37 days.

(21) Appl. No.: 14/620,697

(22) Filed: Feb. 12, 2015

(65) Prior Publication Data

US 2015/0346770 A1 Dec. 3, 2015

(30) Foreign Application Priority Data

May 29, 2014 (JP) .................................. 2014-111451

(51) Int. Cl.
*G06F 1/16* (2006.01)
(52) U.S. Cl.
CPC ............ *G06F 1/1649* (2013.01); *G06F 1/1616* (2013.01); *G06F 1/1622* (2013.01); *G06F 1/1626* (2013.01); *G06F 1/1637* (2013.01); *G06F 1/1647* (2013.01); *G06F 1/1692* (2013.01); *G06F 2200/1614* (2013.01)
(58) Field of Classification Search
CPC ........... G06F 1/1616; G06F 1/20; G06F 3/01; G09G 5/00
USPC ............. 361/679.57, 679.04, 679.01, 679.27, 361/679.06, 679.4, 679.21, 679.05, 679.09, 361/679.48, 679.26; 235/462.41, 462.2; 455/420, 575.3, 557; 345/156, 158, 345/174, 173, 163, 659; 312/223.1, 223.2, 312/223.3, 293.2
See application file for complete search history.

(56) References Cited

U.S. PATENT DOCUMENTS

| | | | |
|---|---|---|---|
| 2007/0047187 A1 | 3/2007 | Kumano | |
| 2008/0055835 A1 | 3/2008 | Kumano | |
| 2010/0124006 A1* | 5/2010 | Chang | G06F 1/1616 361/679.04 |
| 2011/0310313 A1* | 12/2011 | Nakamura | G06F 1/20 348/836 |
| 2012/0218691 A1* | 8/2012 | Minemura | G06F 1/1616 361/679.01 |

FOREIGN PATENT DOCUMENTS

| | | |
|---|---|---|
| JP | H10-240140 | 9/1988 |
| JP | H07-160364 | 6/1995 |
| JP | 2007-58031 A1 | 3/2007 |

\* cited by examiner

*Primary Examiner* — Hung Duong
(74) *Attorney, Agent, or Firm* — Kratz, Quintos & Hanson, LLP

(57) ABSTRACT

An information device includes: a first housing and a second housing coupled through a hinge mechanism, the second housing being openable to a angle from a closed state where the second housing overlaps with the first housing; a third housing attached to a surface of the second housing on a first housing side through a movement mechanism capable of moving the third housing with respect to the second housing from an overlapped state with the second housing; a first display screen provided on a surface of the third housing on the first housing side; and at least one unit selected from a group of a second display screen, an input mechanism, an output mechanism and an input-output mechanism, the surface being exposed when the third housing is moved with respect to the second housing in a state where the second housing is opened with respect to the first housing.

20 Claims, 18 Drawing Sheets

ROTATION ANGLE OF ROTATION PART

ROTATION ANGLE OF ROTATION PART

HORIZONTALLY LONG SCREEN

ROTATION BY 90°

VERTICALLY LONG SCREEN

VERTICALLY LONG CONTENT

INFORMATION DEVICE

CROSS-REFERENCE TO RELATED APPLICATION

This application is based upon and claims the benefit of priority of the prior Japanese Patent Application No. 2014-111451, filed on May 29, 2014, the entire contents of which are incorporated herein by reference.

FIELD

The embodiment discussed herein is related to an information device.

BACKGROUND

An information device such as a laptop computer and a cell-phone includes a main body unit and a display unit with a display screen. In this information device, the display unit is folded relative to the main body unit. The display screen placed over the main body unit is made visible by rotating and opening the display unit using a hinge mechanism against the main body unit.

A related technology is disclosed in Japanese Laid-open Patent Publication No. 07-160364, Japanese Laid-open Patent Publication No. 10-240140, and Japanese Laid-open Patent Publication No. 2007-58031.

SUMMARY

According to an aspect of the embodiments, an information device includes: a first housing and a second housing coupled through a hinge mechanism, the second housing being openable to a angle from a closed state where the second housing overlaps with the first housing; a third housing attached to a surface of the second housing on a first housing side through a movement mechanism capable of moving the third housing with respect to the second housing from an overlapped state with the second housing; a first display screen provided on a surface of the third housing on the first housing side; and at least one unit selected from a group of a second display screen, an input mechanism, an output mechanism and an input-output mechanism, provided on the surface of the second housing on the first housing side, the surface being exposed when the third housing is moved with respect to the second housing in a state where the second housing is opened with respect to the first housing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Figure 1:
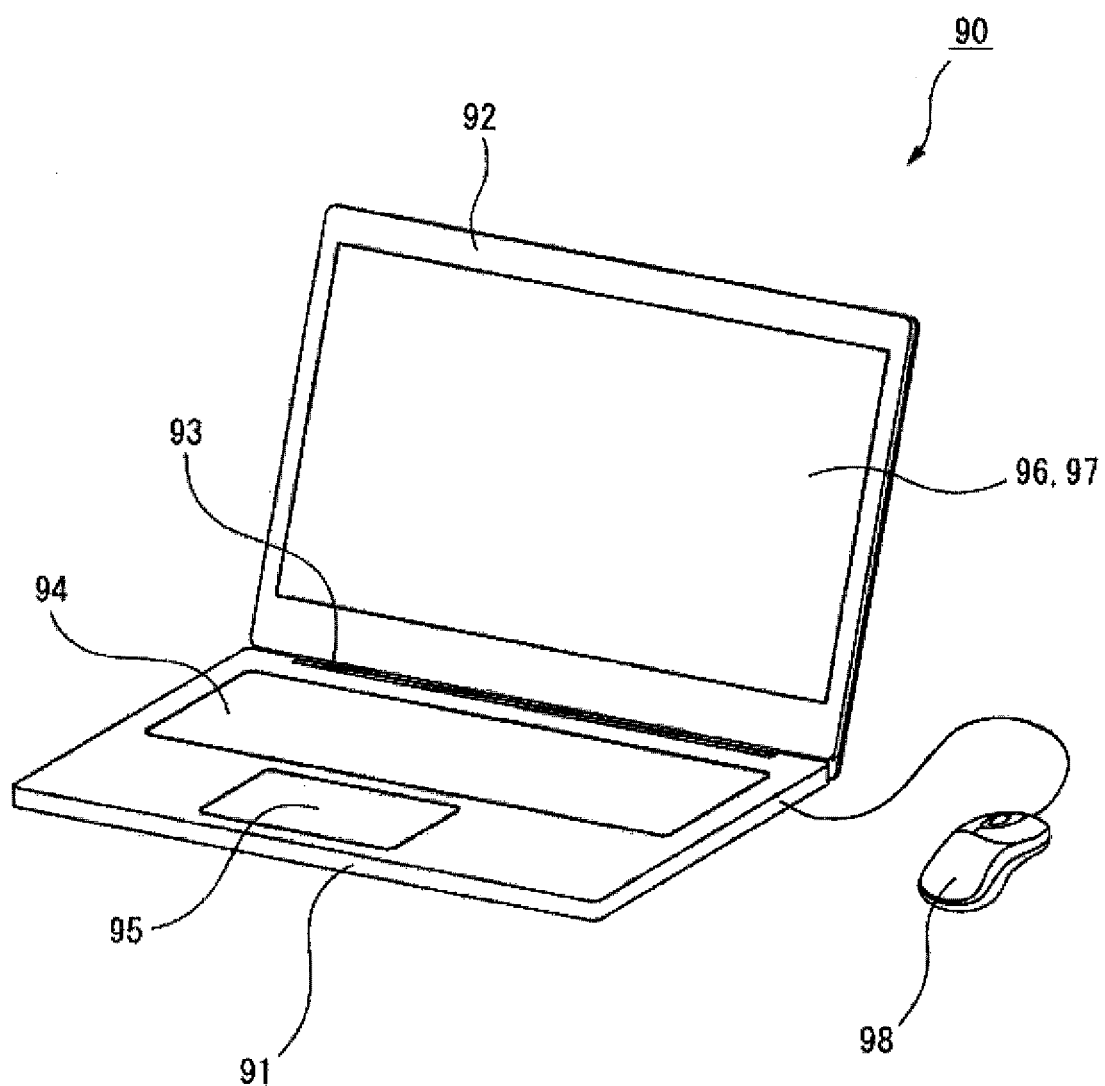
FIG. 1 illustrates an example of a perspective view of an information device.

FIG. 1 illustrates an example of a perspective view of an information device. FIG. 1 illustrates an information device 90 including a display screen and an input unit. For example, the information device 90 is a laptop computer (laptop personal computer) 90. The laptop computer 90 includes a main body unit 91 and a display unit 92, which are rotatably coupled to each other by a hinge mechanism 93. In the main body unit 91, a keyboard 94, a touch pad 95, and a mouse 98 are provided as the input unit. A liquid crystal screen 96 is provided as a display screen in the display unit 92, and a touch panel 97 is attached as an input unit to the liquid crystal screen 96. In this laptop computer 90, the display unit 92 is folded relative to the main body unit 91 by the hinge mechanism 93.

A digital terrestrial broadcast receiver or a video playback device for optical disk is built into the laptop computer 90. Since images to be displayed by such devices are horizontally long, the liquid crystal screen 96 also becomes horizontally long. On the other hand, a display screen in the case of writing sentences using the laptop computer 90 or an internet browsing screen is vertically long. Thus, the horizontally long liquid crystal screen 96 may display only a small amount of information, resulting in an increase in the number of times of scrolling the screen in a vertical direction.

For example, the display screen of the laptop computer is rotated by 90 degrees to be vertically long. In a computer with a main body unit, a keyboard unit, and a display unit, which are independently provided, such as a desktop personal computer, the display unit is rotated by 90 degrees with respect to a stand for use in a vertically long manner.

It may impair the operability of the information device to make the display screen vertically long for increasing amounts of information along with improvement in performance of the information device, such as browsing and processing of large amounts of data through Internet connection or acquisition and editing of photo images and video footage.

In a two-layered display unit including display screens, for example, moving the display screen in the first layer as appropriate exposes the display screen or the input unit in the second layer. Therefore, an input-output area of a user interface may be increased.

As for the hinge mechanism 93, keyboard 94, touch pad 95, and liquid crystal screen 96 illustrated in FIG. 1, when substantially the same or similar members are used hereinafter, the same reference numerals may be used and description thereof may be omitted or reduced. In the following drawings, the mouse 98 illustrated in FIG. 1 may be omitted. The liquid crystal screen 96 may be hereinafter described as a main display screen 96.

Figure 2A:
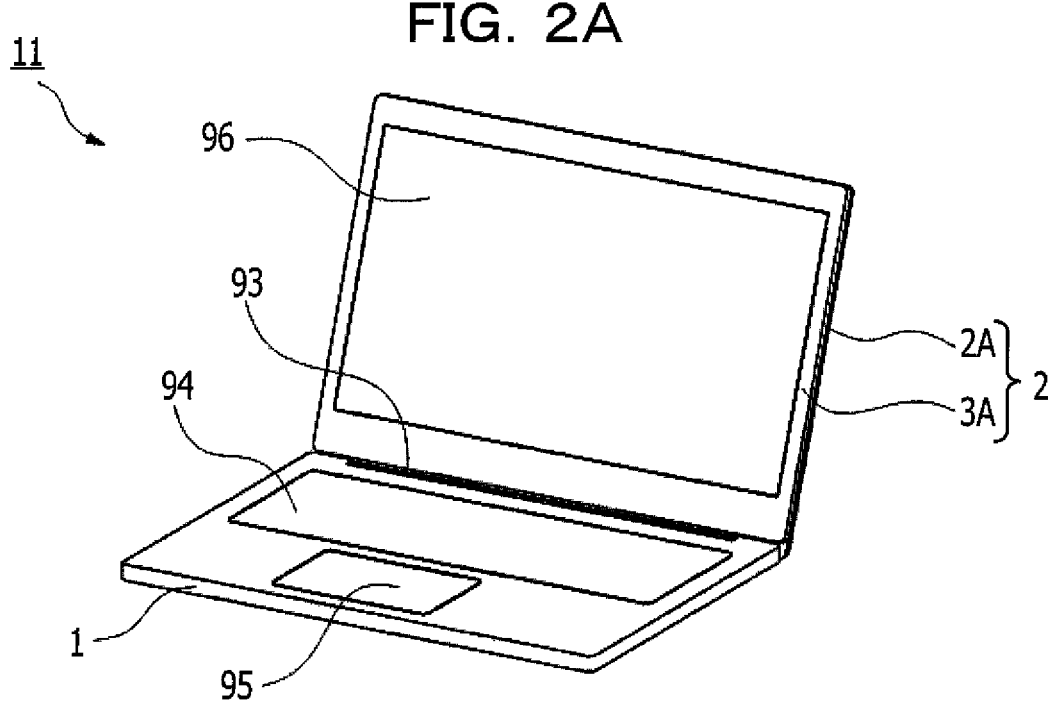
FIG. 2A illustrates an example of a perspective view of the information device.
Figure 2B:
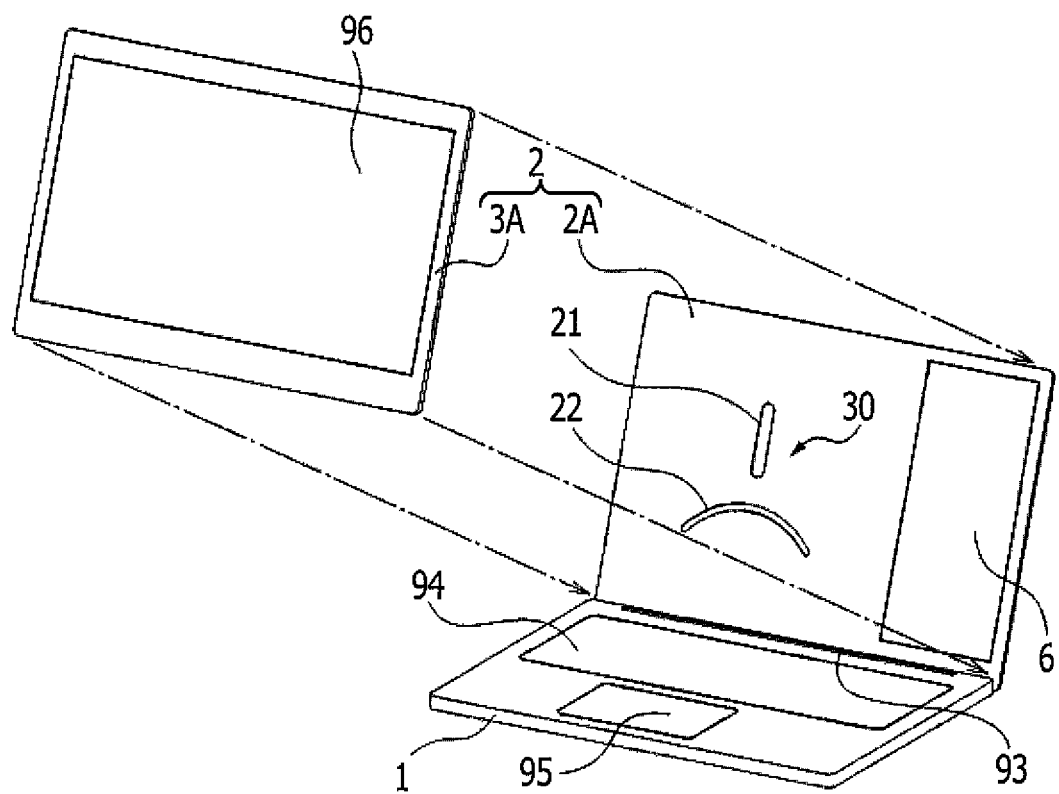
FIG. 2B illustrates an example of an assembly perspective view of a display unit.

FIG. 2A illustrates an example of a perspective view of an information device. FIG. 2B illustrates an example of an assembly perspective view of a display unit. FIG. 2A is a perspective view illustrating an information device having the display unit hinge-coupled to a main body unit. In an information device 11, a display unit 2 corresponding to a second housing is hinge-coupled to a main body unit 1 corresponding to a first housing by a hinge mechanism 93. The information device 11 illustrated in FIGS. 2A and 2B may be different from the computer 90 illustrated in FIG. 1 in the structure of the display unit 2. In the information device 11, the display unit 2 includes: a fixed part 2A coupled to the main body unit 1 by the hinge mechanism 93; and a rotation part 3A corresponding to a third housing overlapping with the main body side of the fixed part 2A.

FIG. 2B illustrates details of the structure of the display unit 2 in the information device 11 illustrated in FIG. 2A. FIG. 2B is an assembly perspective view illustrating the structure of the display unit in the information device illustrated in FIG. 2A, the structure being broken down into a rotation part with a main display screen and a fixed part with a sub-display screen. In the information device 11, the main display screen 96 is provided in the rotation part 3A rather than the fixed part 2A coupled to the main body unit 1 by the hinge mechanism 93. The rotation part 3A is provided on the fixed part 2A while overlapping therewith. On a surface of the fixed part 2A on the main body unit 1 side, for example, a surface to be overlapped with the rotation part 3A, a sub-display screen 6 and first and second grooves 21 and 22 of a rotational movement mechanism are provided. At the position of the sub-display screen 6, for example, a touch panel may be mounted as a liquid crystal screen to serve as an input unit. At the position of the sub-display screen 6, another input-output unit, for example, a flat keyboard, a touch pad, an electromagnetic guidance digitizer, or speaker, or the like may be provided. The type of such an input-output unit is not particularly limited.

Figure 3A:
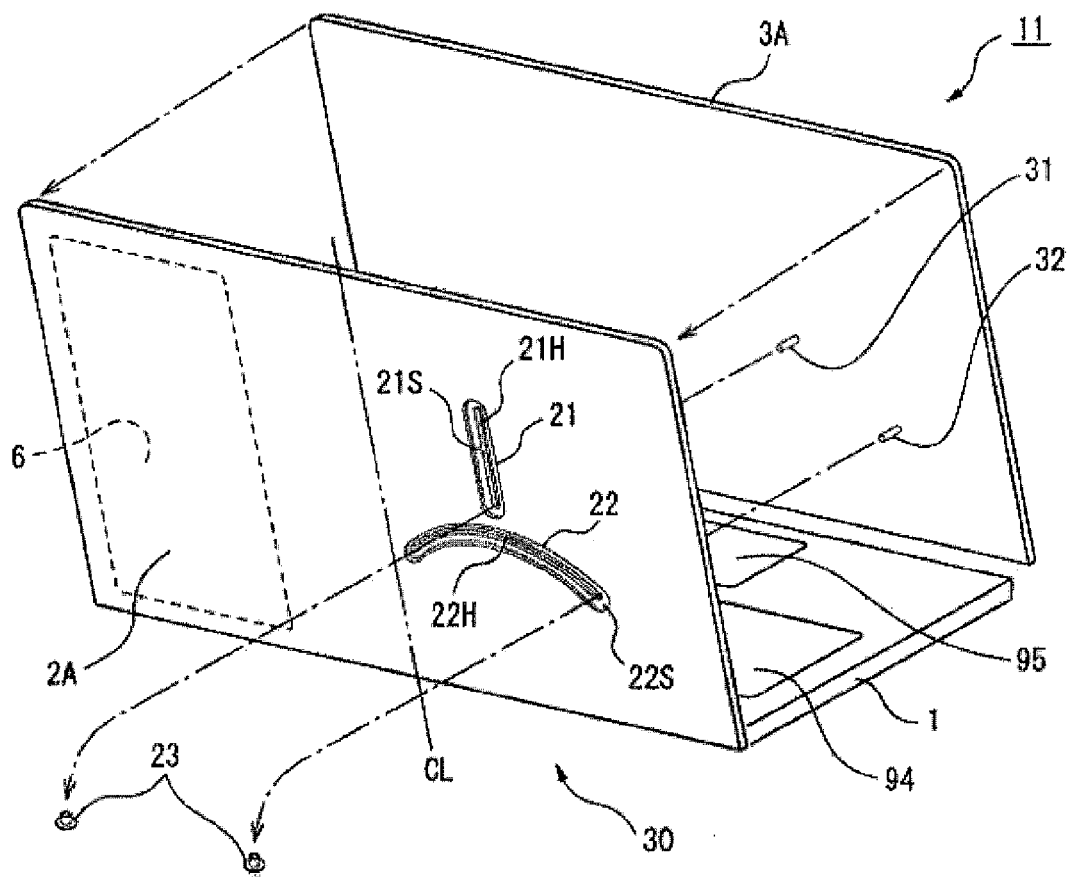
FIG. 3A illustrates an example of an assembly perspective view of the information device.
Figure 3B:
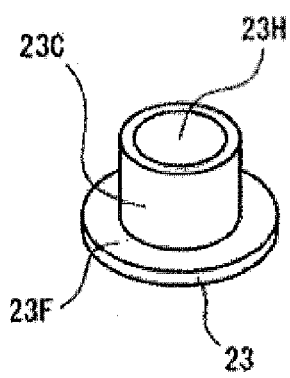
FIG. 3B illustrates an example of a perspective view of a slide piece.
Figure 3C:
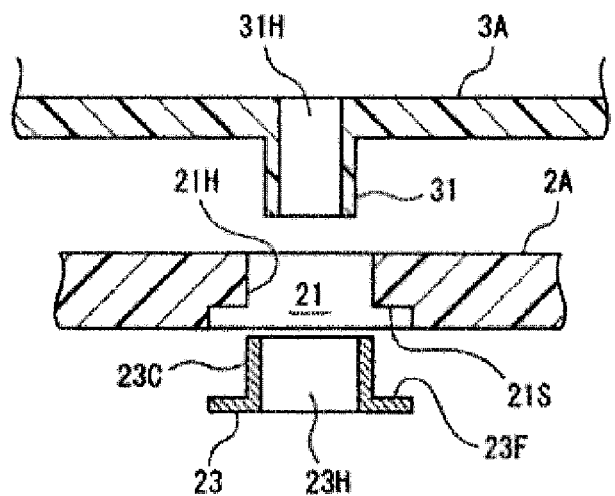
FIG. 3C illustrates an example of a main part cross-sectional view of the information device.

FIG. 3A illustrates an example of an assembly perspective view of an information device. FIG. 3B illustrates an example of a perspective view of a slide piece. FIG. 3C illustrates an example of a main part cross-sectional view of an information device. FIG. 3A illustrates an assembly perspective view when the information device illustrated in FIG. 2B is viewed from the back. FIG. 3A illustrates a structure of a rotational movement mechanism 30 when the information device 11 illustrated in FIG. 2B is viewed from the back side of the fixed part 2A. The rotational movement mechanism 30 includes the first and second grooves 21 and 22, first and second pins 31 and 32, and slide pieces 23. The first and second grooves 21 and 22 are provided in the fixed part 2A. The first and second pins 31 and 32 are provided so as to protrude on the surface of the rotation part 3A on the fixed part 2A side, and are inserted into the first and second grooves 21 and 22, respectively, when the rotation part 3A is placed on the fixed part 2A. The first and second pins 31 and 32 inserted into the first and second grooves 21 and 22 are fitted to the slide pieces 23 in the first and second grooves 21 and 22.

FIG. 3A illustrates as if the fixed part 2A is a plate and the first and second grooves 21 and 22 are formed in a back plate. However, the fixed part 2A may be a housing thick enough to include a circuit therein. The first and second grooves 21 and 22 may be formed in an inner circumferential surface of the housing on the rotation part 3A side. In the information device 11, a through-hole is provided in the first pin 31, into which a cable for transmitting signals is inserted. However, no through-hole is provided in the second pin 32. The through-hole may be provided in the second pin 32.

FIG. 3B illustrates a perspective view of the slide piece used in the rotational movement mechanism in the information device illustrated in FIG. 3A. The first and second grooves 21 and 22 provided in the fixed part 2A include shallow grooves 21S and 22S and through-holes 21H and 22H into which the first and second pins 31 and 32 are inserted, the first and second pins being provided so as to protrude on the rotation part 3A. The slide piece 23 includes:

a flange part 23F that slides on the shallow groove 21S or 22S; and a small-diameter part 23C to be inserted into the through-hole 21H or 22H. In the small-diameter part 23C, a through-hole 23H is provided, into which the first and second pins 31 and 32 are inserted.

FIG. 3C illustrates a main part cross-sectional view of the information device illustrated in FIG. 3A. FIG. 3C illustrates the cross-section of a section of the first groove 21 illustrated in FIG. 3A, into which the first pin 31 is inserted. FIG. 3C illustrates, for example, a state before the slide piece 23 is fitted to the first pin 31 to be inserted into the first groove 21. The slide piece 23 is connected and fixed to the first pin 31, and is slidably moved inside the first groove 21 by the movement of the first pin 31. In the first pin 31, a through-hole 31H is provided, into which a cable is inserted.

The first groove 21 provided in the fixed part 2A is a linear groove at a position offset to the side where the sub-display screen 6 is not provided, with respect to a center line CL that divides the fixed part 2A into two equal left and right parts. The second groove 22 is a groove curved in a convex shape, which is provided closer to the hinge mechanism 93 than the first groove 21, and is symmetrical to the center line of the first groove 21.

Figure 4A:
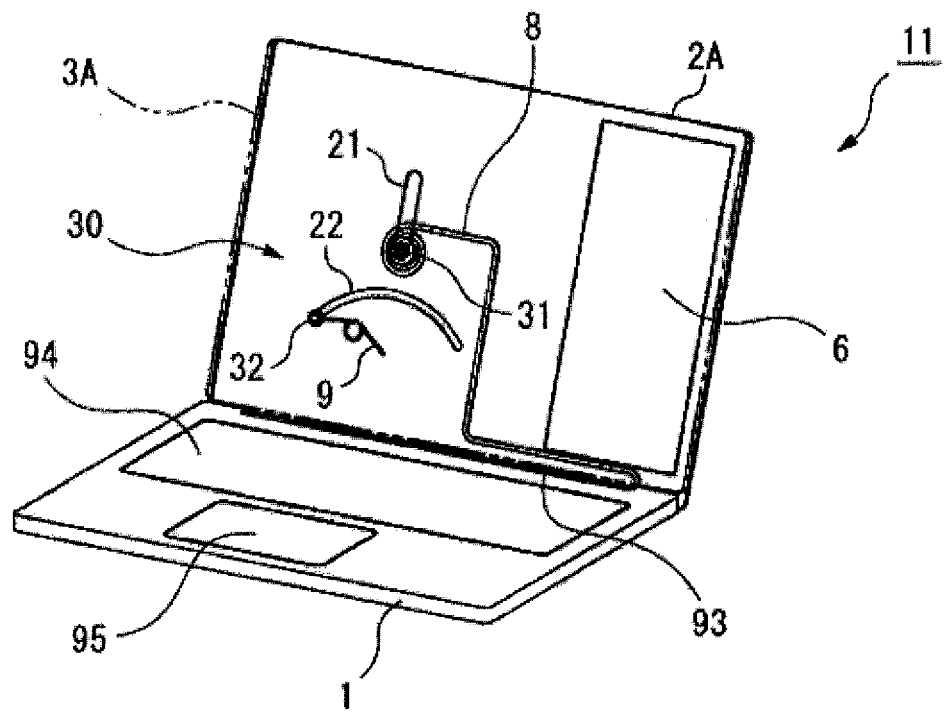
FIG. 4A illustrates an example of a perspective view from the front side of a rotational movement mechanism.
Figure 4B:
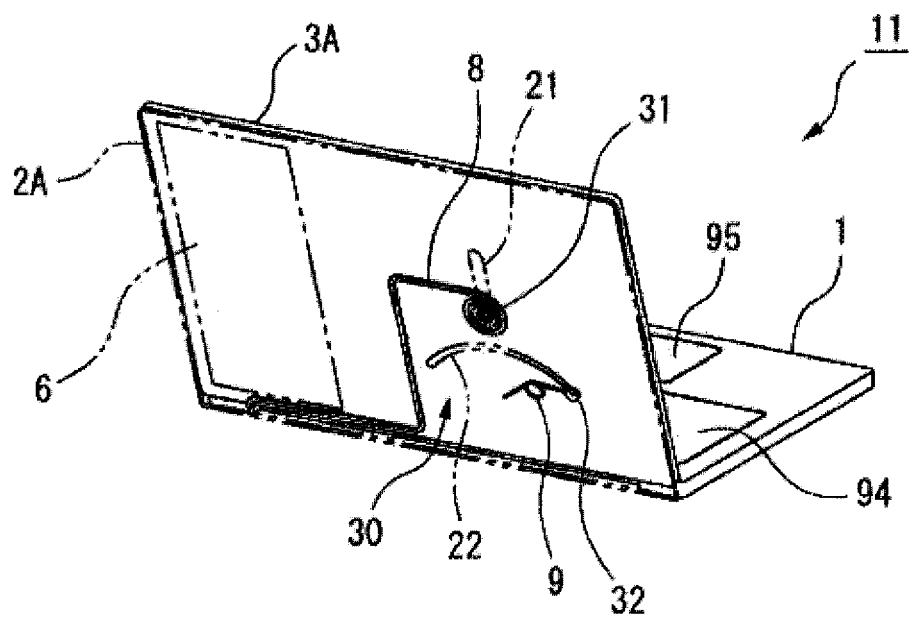
FIG. 4B illustrates an example of a perspective view from the back side of an rotational movement mechanism.

FIG. 4A illustrates an example of a perspective view from the front side of a rotational movement mechanism. FIG. 4B illustrates an example of a perspective view from the back side of a rotational movement mechanism. FIG. 4A illustrates a front perspective view of the rotational movement mechanism 30 used in the information device 11 illustrated in FIG. 2A. FIG. 4B illustrates a back perspective view of the rotational movement mechanism 30 used in the information device 11 illustrated in FIG. 2A. For example, the position of the rotation part 3A is indicated by the double-dashed line in FIG. 4A, while the position of the fixed part 2A is indicated by the double-dashed line in FIG. 4B.

In the information device 11 illustrated in FIG. 2B, the sub-display screen 6 is provided in the fixed part 2A and the main display screen 96 is provided in the rotation part 3A. Therefore, display data is sent from the fixed part 2A side to the main display screen 96 in the rotation part 3A. For example, when a touch panel is provided on the main display screen 96, touch information is sent to the fixed part 2A side or the main body unit 1. FIGS. 4A and 4B illustrate the disposition of a cable 8 that couples an electric circuit in the fixed part 2A with an electric circuit in the rotation part 3A. Since the through-hole 31H is provided in the first pin 31, the cable 8 couples the electric circuit in the fixed part 2A with the electric circuit in the rotation part 3A through the through-hole 31H.

The rotation part 3A is rotated with respect to the fixed part 2A, and the first pin 31 is also rotated inside the first groove 21. For example, the cable 8 passing through the through-hole 31H in the first pin 31 may be wound a certain number of times inside the fixed part 2A so as to buffer the rotation force of the first pin 31 with respect to the first groove 21.

As illustrated in FIGS. 4A and 4B, a torsion spring 9 is provided between the second pin 32 and the fixed part 2A. The torsion spring 9 energizes the second pin 32 toward any one of the ends of the curved second groove 22.

Figure 5A:
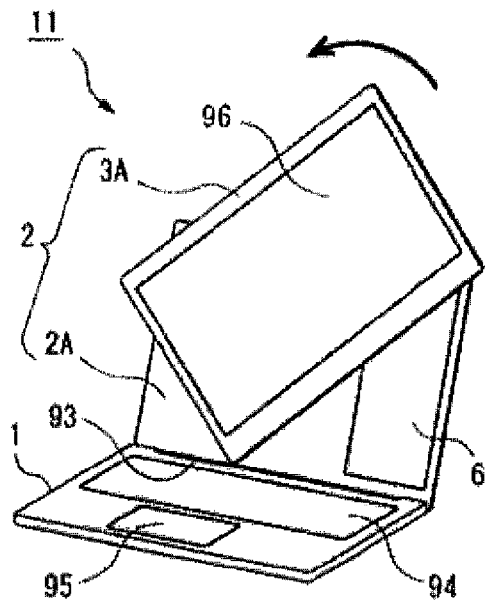
FIGS. 5A to 5D illustrate an example of an operation of an information device.
Figure 5B:
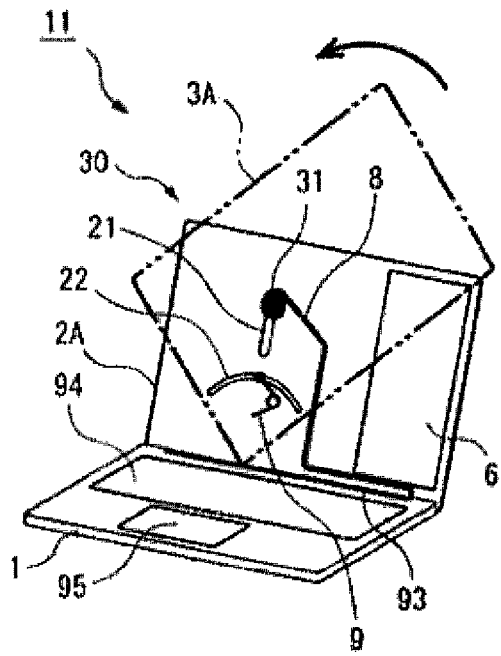
Figure 5C:
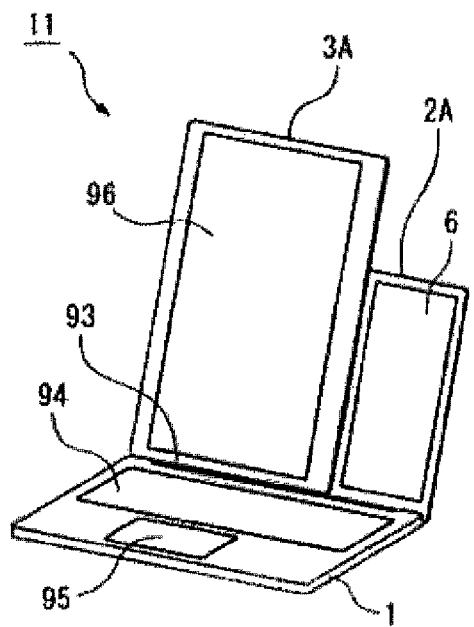
Figure 5D:
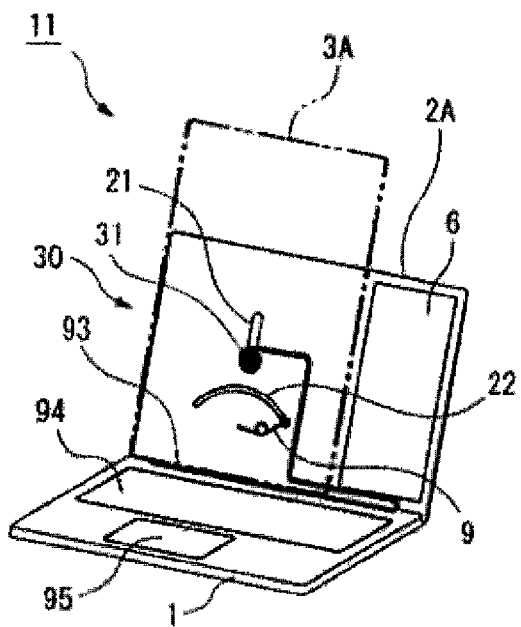
Figure 6A:
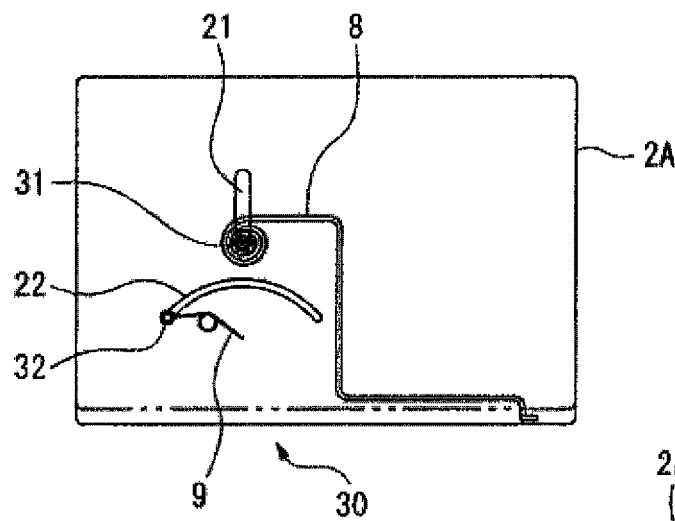
FIGS. 6A to 6C illustrate an example of an operation of the information device.
Figure 6B:
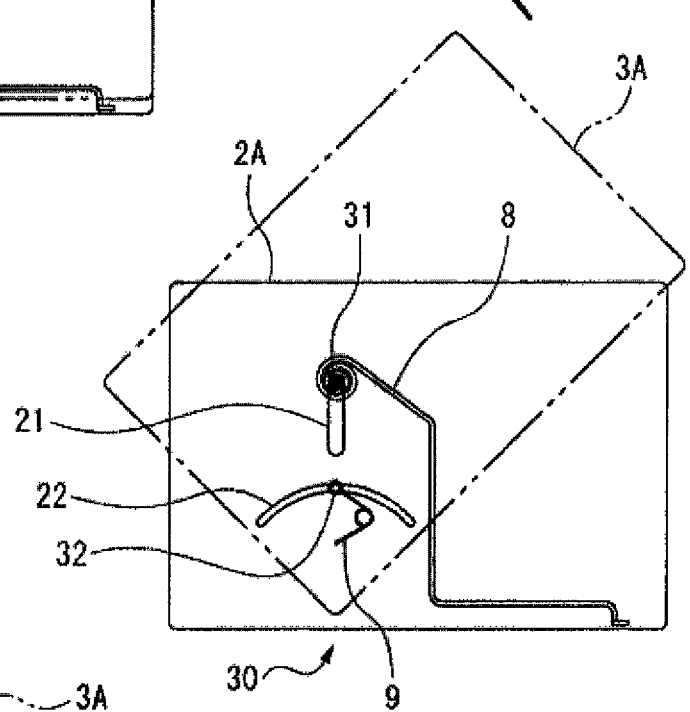
Figure 6C:
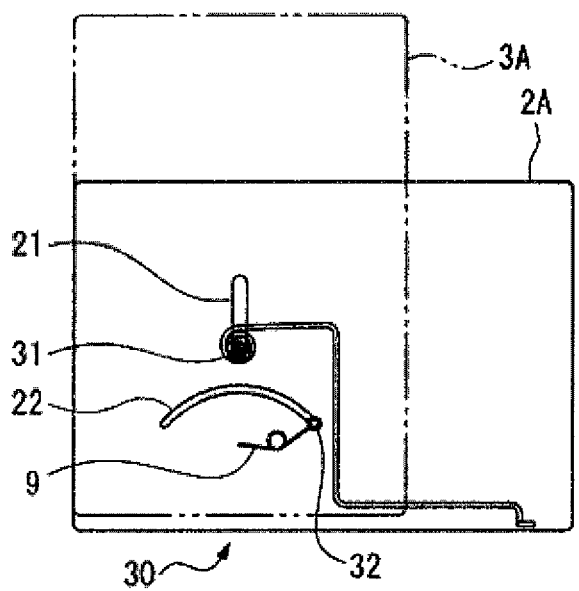
Figure 7A:
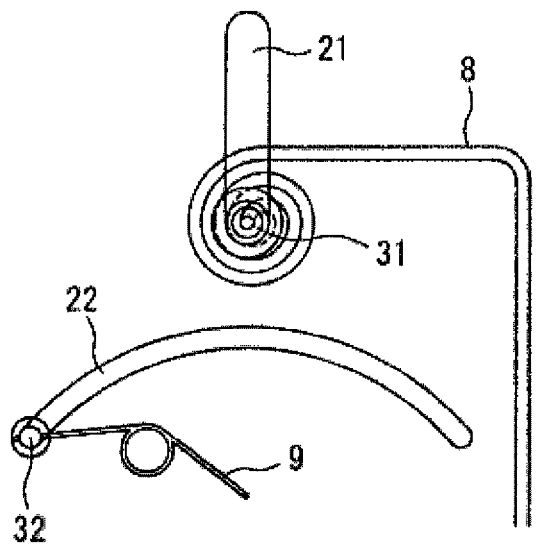
FIGS. 7A to 7C illustrate an example of an operation of the information device.
Figure 7B:
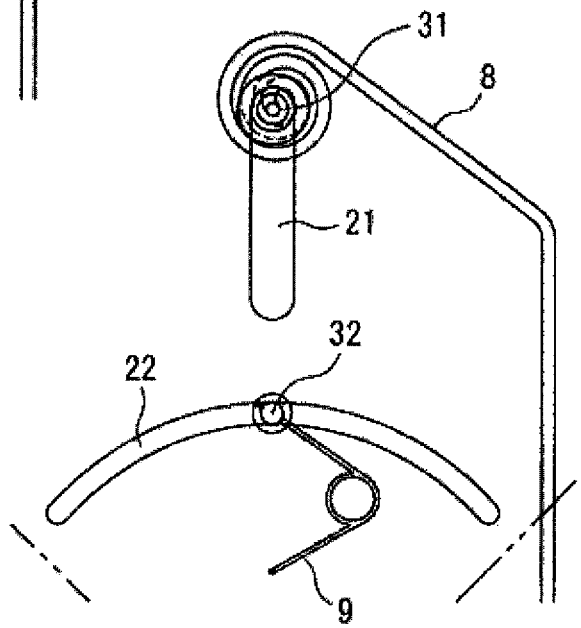
Figure 7C:
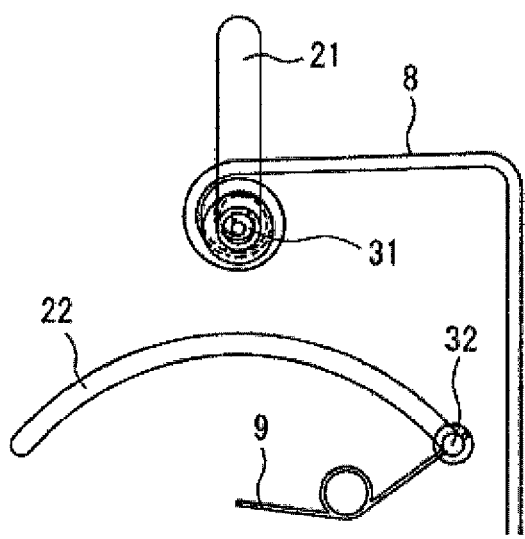

FIGS. 5A to 5D, 6A to 6C, and 7A to 7C illustrate an example of an operation of an information device. FIG. 5A is a perspective view illustrating a state where the rotation part of the information device illustrated in FIG. 4A is rotated to the left with respect to the fixed part by the rotational movement mechanism. FIG. 5B is a front perspective view of the rotational movement mechanism of the information device in the state illustrated in FIG. 5A. FIG. 5C is a perspective view illustrating a state where the rotation part of the information device illustrated in FIG. 5A has finished its rotation to the left with respect to the fixed part by the rotational movement mechanism. FIG. 5D is a front perspective view of the rotational movement mechanism of the information device in the state illustrated in FIG. 5C. FIG. 6A illustrates a front view of the rotational movement mechanism illustrated in FIG. 4A. FIG. 6B illustrates a front view of the rotational movement mechanism illustrated in FIG. 5B. FIG. 6C illustrates a front view of the rotational movement mechanism illustrated in FIG. 5D. FIG. 7A illustrates an enlarged view of the rotational movement mechanism illustrated in FIG. 6A. FIG. 7B illustrates an enlarged view of the rotational movement mechanism illustrated in FIG. 6B. FIG. 7C illustrates an enlarged view of the rotational movement mechanism illustrated in FIG. 6C.

FIG. 2A illustrates a state where the display unit 2 is opened from the state where the display unit 2 is folded on the main body unit 1. In this state, the rotation part 3A is placed on the fixed part 2A of the display unit 2, and the information device 11 may be used as a normal laptop computer. FIG. 6A illustrates a state of the rotational movement mechanism 30 in the fixed part 2A in the state illustrated in FIG. 2A. FIG. 7A illustrates an enlarged view of the main part of FIG. 6B. In this state, the first pin 31 is positioned in a lower bottom portion of the first groove 21. The second pin 32 is positioned at one of the ends of the second groove 22 in an energized state by the torsion spring 9 having one end turnably attached to the fixed part 2A. Thus, the rotation part 3A does not rattle with respect to the fixed part 2A.

When the right side of the rotation part 3A is lifted from the state illustrated in FIG. 2A, the rotation part 3A is rotated to the left (counterclockwise) with respect to the fixed part 2A. In this event, a lower left end portion of the rotation part 3A is moved in a horizontal direction over the main body unit 1. In the state where the rotation part 3A is rotated to the left with respect to the fixed part 2A, the first pin 31 is moved back and forth inside the first groove 21, and the second pin 32 is moved from one of the ends of the second groove 22 to the other end thereof. The torsion spring 9 is compressed during the movement of the second pin 32 within the second groove 22.

FIG. 5A illustrates a state where the rotation part 3A is rotated to the left by 45° with respect to the fixed part 2A. In this state, as illustrated in FIGS. 5B, 6B, and 7B, the first pin 31 is positioned in an upper bottom portion of the first groove 21, the second pin 32 is positioned in the center of the second groove 22, and the torsion spring 9 is compressed to the maximum. When the rotation part 3A is rotated further to the left with respect to the fixed part 2A from the state illustrated in FIG. 5A, the first pin 31 is moved from the upper bottom portion to the lower bottom portion side of the first groove 21. The second pin 32 is further moved to the other end of the second groove 22, and the compression degree of the torsion spring 9 is reduced.

FIG. 5C illustrates a state where the rotation part 3A is rotated to the left by 90° with respect to the fixed part 2A. In this state, the upper long side of the rotation part 3A overlaps with the left short side of the fixed part 2A. As illustrated in FIGS. 5D, 6C, and 7C, the first pin 31 is returned to the lower bottom portion of the first groove 21, and the second pin 32 is positioned at the other end of the second groove 22. Also in the state where the second pin 32 is positioned at the other end of the second groove 22, the torsion spring 9 is in the compressed state and energizes the second pin 32 toward the other end of the second groove 22. Thus, the rotation part 3A does not rattle with respect to the fixed part 2A.

In the information device 11, the first groove 21 provided in the fixed part 2A is provided at the position offset to the side where the sub-display screen 6 is not provided, with respect to the center line CL that divides the fixed part 2A into two equal left and right parts. Thus, in the state where the rotation part 3A is rotated by 90° with respect to the fixed part 2A, the upper long side of the rotation part 3A overlaps with the left short side of the fixed part 2A, and the sub-display screen 6 provided in the fixed part 2A appears to the right side of the rotation part 3A. Thus, when an image is displayed on the sub-display screen 6, the number of the display screens is increased, in addition to an image displayed on the main display screen 96 in the rotation part 3A. Since the touch panel mounted on the sub-display screen 6 is used as the input unit, for example, the application of the information device 11 may be extended.

Figure 8A:
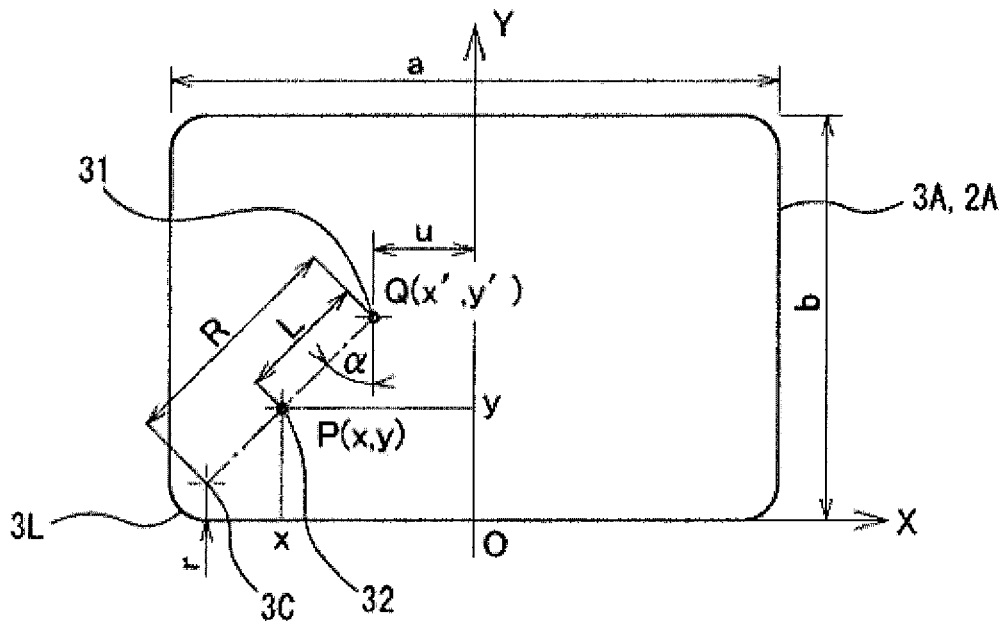
FIGS. 8A and 8B illustrate an example of a trajectory of a first pin and a second pin.
Figure 8B:
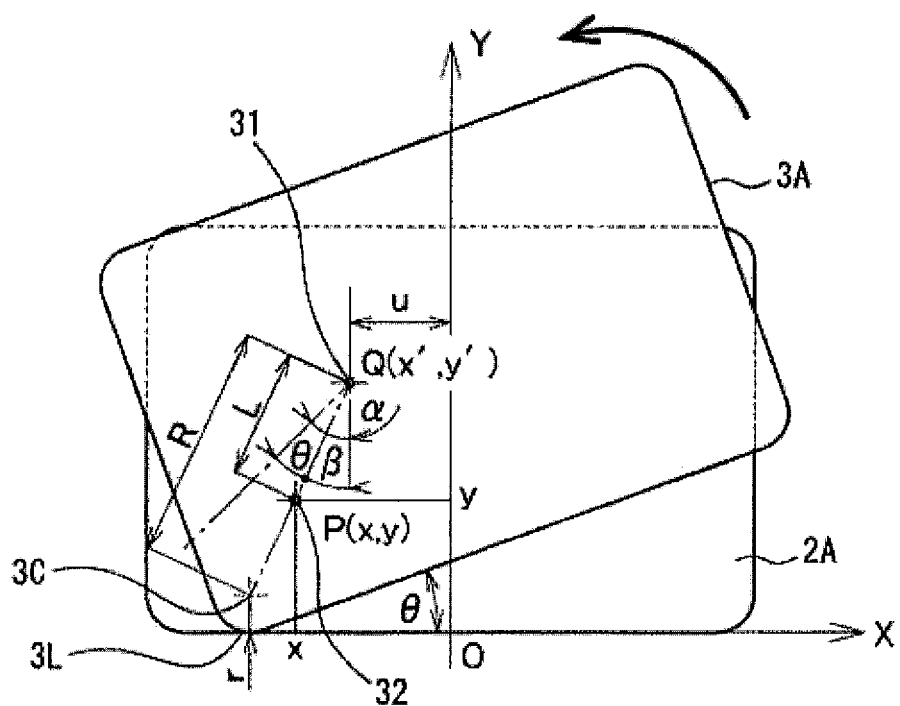

FIGS. 8A and 8B illustrate an example of a trajectory of a first pin and a second pin. FIG. 8A illustrates the positions of first and second guide pins in the rotational movement mechanism when the rotation angle of the rotation part is 0 degrees. FIG. 8B illustrates the trajectory of the first and second guide pins in the rotational movement mechanism when the rotation angle of the rotation part is 0 degrees. In FIG. 8A, movement loci of the first and second pins 31 and 32 are obtained when a lower left corner portion 3L of the rotation part 3A is horizontally moved. The movement loci of the first and second pins 31 and 32 may correspond to the shapes of the first and second grooves 21 and 22.

The reference numerals illustrated in FIG. 8A denote as follows: P (x, y), coordinates of the second pin 32; Q (x', y'), coordinates of the first pin 31; u, an offset amount of the first pin 31 from the center line (Y-axis) of the rotation part 3A and the fixed part 2A; r, a radius of the corner portion 3L; R, a distance between the center 3C of the corner portion 3L and the first pin 31; L, a distance between the first and second pins 31 and 32; α, an angle formed by a line coupling the first and second pins 31 and 32 and a vertical line passing through the first pin 31; a, a width of the rotation part 3A (width of the fixed part 2A); and b, a height of the rotation part 3A (height of the fixed part 2A).

The second pin 32 is provided on a line coupling the first pin 31 with the center 3C of the corner portion 3L. The first pin 31 is offset by the distance u to the left from the center line (Y-axis) of the rotation part 3A (and the fixed part 2A), and is provided at a center position (position that is b/2 of the distance from X-axis) in the short side direction (length b) of the rotation part 3A.

In FIG. 8A illustrating the case where the rotation angle of the rotation part 3A is 0°, the distance R between the center 3C of the corner portion 3L and the first pin 31 is obtained by the following equation (1).

$$R=[(a/2-u-r)^2+(b/2-r)^2]^{1/2} \quad (1)$$

The angle α formed by the line coupling the first and second pins 31 and 32 and the vertical line passing through the first pin 31 is obtained by the following equation (2).

$$\alpha=\tan^{-1}[(a/2-u-r)/(b/2-r)] \quad (2)$$

The following equation (3) expresses a difference β between the angle α and the rotation angle θ when the rotation part 3A is rotated by the rotation angle θ.

$$\beta=\alpha-\theta \quad (3)$$

Equations (4) and (5) express the coordinates P (x, y) of the second pin 32, while Equations (6) and (7) express the coordinates Q (x', y') of the first pin 31.

$$x=-L\times\sin\beta-u \quad (4)$$

$$y=y'-L\times\cos\beta \quad (5)$$

$$x'=-u=-(a/2-b/2) \quad (6)$$

$$y'=R\times\cos\beta+r \quad (7)$$

As for the coordinates P (x, y) of the second pin 32, Equation (8) expressing a relationship between x and y is obtained by eliminating sin β and cos β from Equations (4) and (5).

$$[(x+u)^2/L^2]+[(y-r)^2/(R-L)^2]=1 \quad (8)$$

Figure 9:
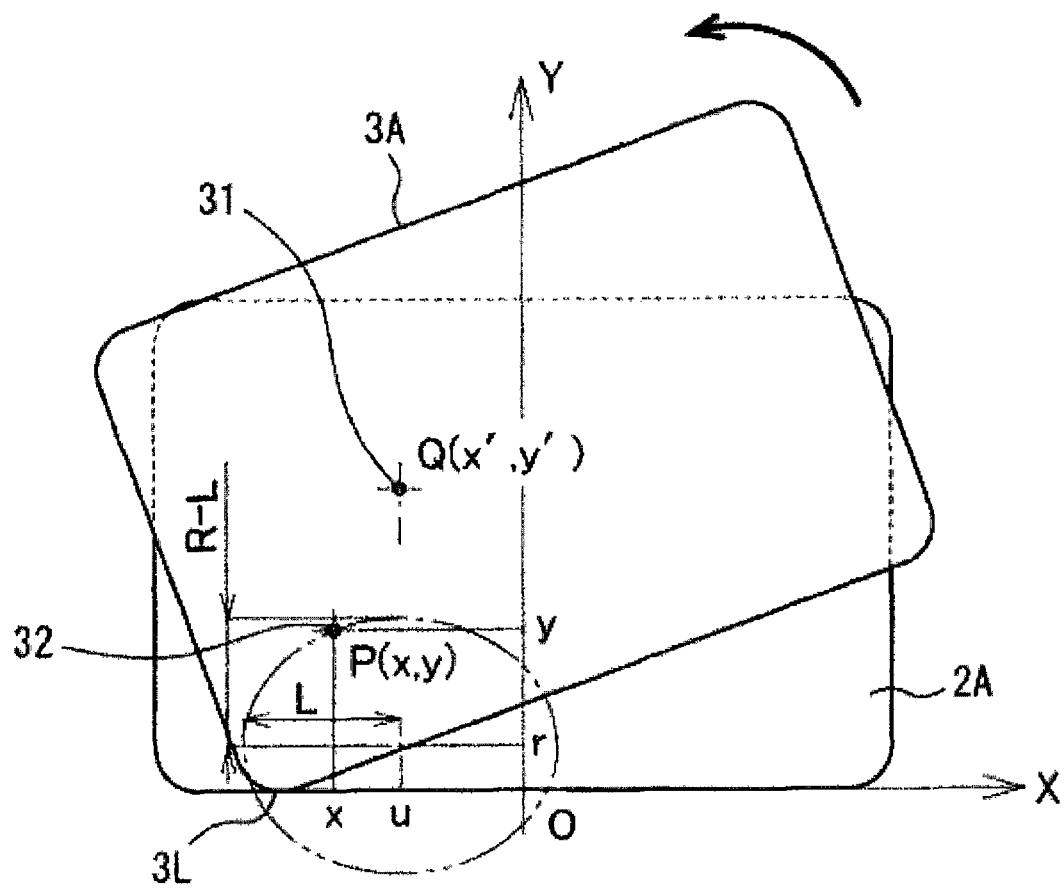
FIG. 9 illustrates an example of a trajectory of a guide pin.

FIG. 9 illustrates an example of a trajectory of a guide pin. In FIG. 9, the trajectory of the first and second guide pins in the rotational movement mechanism is calculated. As illustrated in FIG. 9, Equation (8) expresses an ellipse with the center (−u, r), a long radius=L, and a short radius=R−L. For example, the trajectory of the coordinates P (x, y) of the second pin 32 takes the form of an ellipse. Meanwhile, the trajectory of the coordinates Q (x', y') of the first pin 31 takes the form of a vertical line as expressed by Equation (6).

The shape of the second groove 22 provided in the fixed part 2A may be a part of the ellipse. By forming the first groove 21 in the shape of a line parallel to the short side of the fixed part 2A, the lower left corner portion 3L of the rotation part 3A is horizontally moved when rotating the rotation part 3A.

Figure 10A:
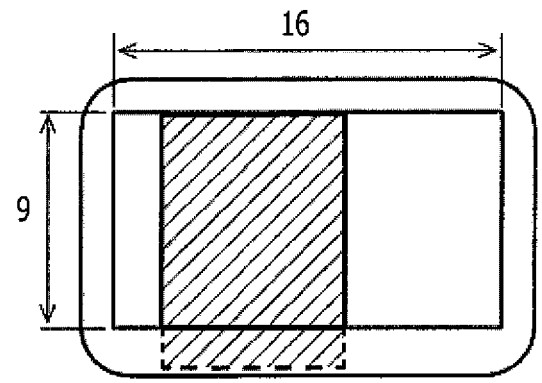
FIGS. 10A and 10B illustrate an example of a state of an image.
Figure 10A:
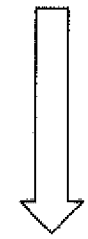
Figure 10B:
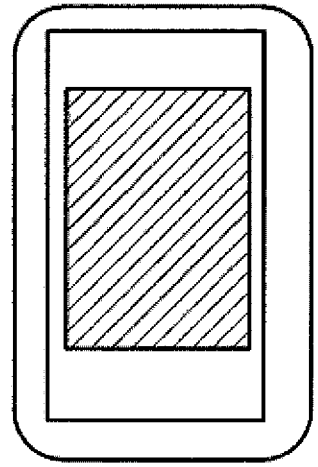

FIGS. 10A and 10B illustrate an example of a state of an image. FIG. 10A illustrates a state of an image when a vertically long image is displayed on a horizontally long main display screen of the information device. FIG. 10B illustrates a state of an image when the vertically long image is displayed on the main display screen when the rotation part including the main display screen is rotated with respect to the fixed part from the state illustrated in FIG. 10A. In the information device 11, as illustrated in FIG. 10A, for example, a vertical long content is displayed on a horizontally long screen with an aspect ratio of 9:16, the vertically long content exceeding the vertical length of the screen. In this event, a vertically long screen as illustrated in FIG. 10B is formed by rotating the rotation part by 90° with respect to the fixed part. Therefore, the content display area is increased in the vertical direction by changing the horizontally long screen to the vertically long screen during the display of the vertically long content. This may make the content easy to view. For example, an amount of the vertically long content sticking out of the screen is reduced, and thus the number of times of screen scrolling is reduced. As a result, the user friendliness of the information device 11 may be improved.

The horizontal position of the rotation part 3A changed to the vertically long state is determined by the value of the offset amount u of the first pin 31 in FIG. 8A from the center line (Y-axis) of the rotation part 3A and the fixed part 2A. In the information device 11, the value of the offset amount u in FIG. 8A is set to u=−(a−b)/2. Therefore, when the rotation part 3A is rotated by 90°, the left long side of the rotation part 3A overlaps with the left short side of the fixed part 2A.

Figure 11A:
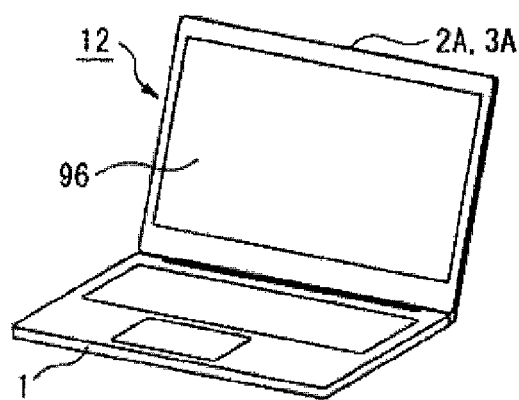
FIG. 11A illustrates an example of an assembly perspective view of an information device.
Figure 11B:
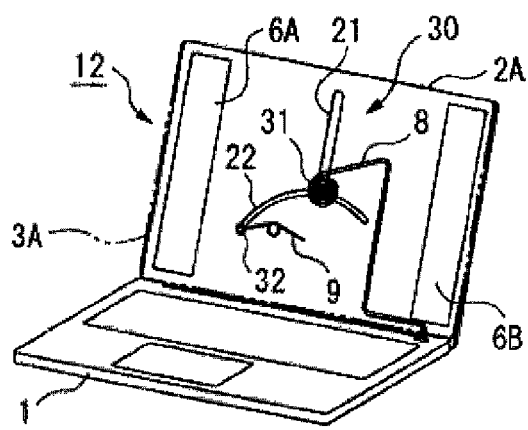
FIG. 11B illustrates an example of a perspective view from the front side of a rotational movement mechanism.
Figure 11C:
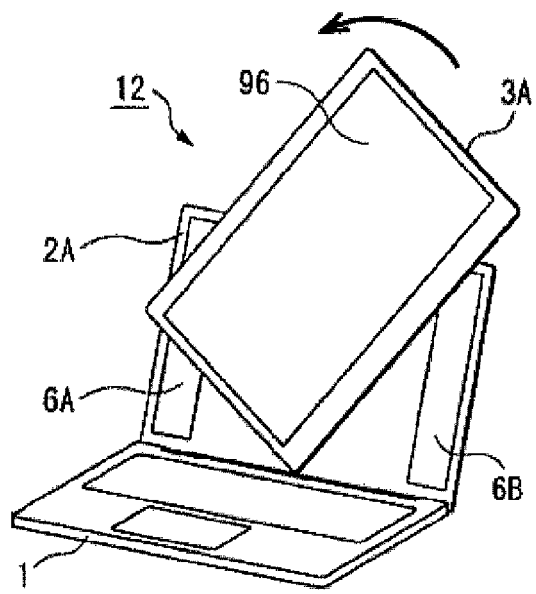
FIG. 11C illustrates an example of a perspective view of a rotation part.
Figure 11D:
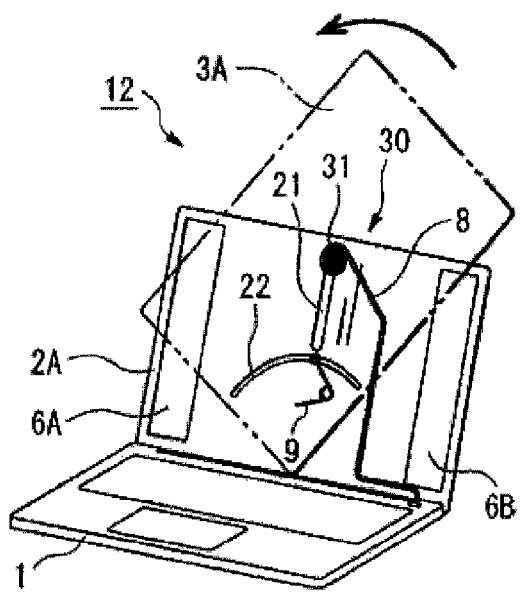
FIG. 11D illustrates an example of a perspective view from the front side of a rotational movement mechanism.
Figure 11E:
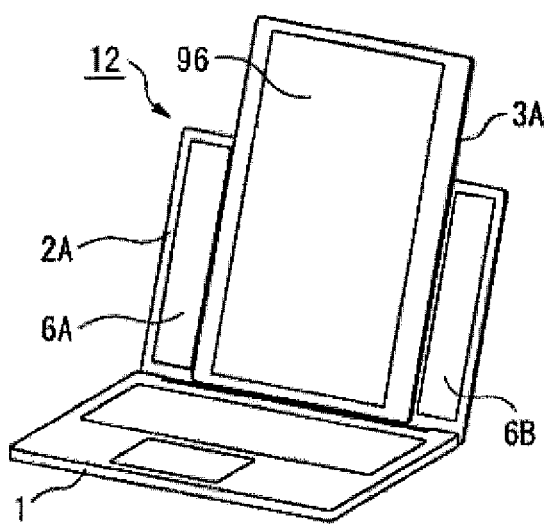
FIG. 11E illustrates an example of a perspective view of a rotation part.
Figure 11F:
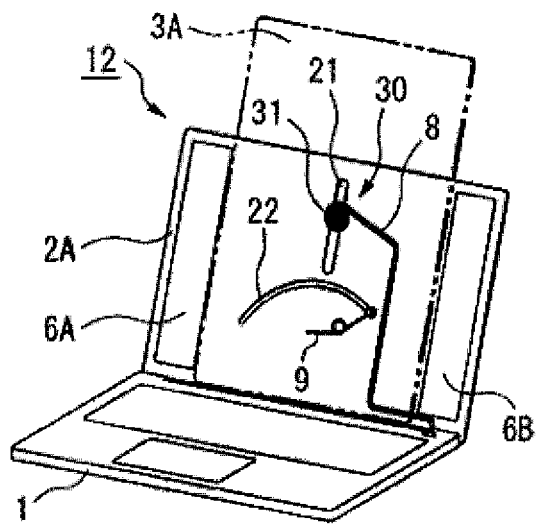
FIG. 11F illustrates an example of a perspective view from the front side of a rotational movement mechanism.

FIG. 11A illustrates an example of an assembly perspective view of an information device. FIG. 11B illustrates an example of a perspective view from the front side of a rotational movement mechanism. FIG. 11C illustrates an example of a perspective view of a rotation part. FIG. 11D illustrates an example of a perspective view from the front side of a rotational movement mechanism. FIG. 11E illustrates an example of a perspective view of a rotation part. FIG. 11F illustrates an example of a perspective view from the front side of a rotational movement mechanism. FIG. 11A illustrates the main display screen side of the information device including the rotation part with a main display screen and a fixed part with a sub-display screen. FIG. 11B is a front perspective view of the rotational movement mechanism in the information device illustrated in FIG. 11A. FIG. 11C illustrates a state where the rotation part of the information device illustrated in FIG. 11A is rotated to the left with respect to the fixed part by the rotational movement mechanism. FIG. 11D is a front perspective view of the rotational movement mechanism of the information device in the state illustrated in FIG. 11C. FIG. 11E illustrates a state where the rotation part of the information device illustrated in FIG. 11A has finished its rotation to the left with respect to the fixed part by the rotational movement mechanism. FIG. 11F is a front perspective view of the rotational movement mechanism of the information device in the state illustrated in FIG. 11E. For example, the value of the offset amount u may be 0. As illustrated in FIG. 11A, the shape of the information device 12 when the rotation part 3A is not rotated is the same as that of the information device 11 illustrated in FIGS. 2A and 2B. In the information device 12, the rotational movement mechanism 30 is provided in the center of the fixed part 2A, as illustrated in FIG. 11B.

Thus, as illustrated in FIG. 11B, a first pin 31 provided so as to protrude on the back side of the rotation part 3A is positioned on the center line (Y-axis) (see FIG. 8A) of the rotation part 3A and the fixed part 2A, and the value of the offset amount u is 0. The center line of a first groove 21 provided in the fixed part 2A is also on the center line (Y-axis) of the rotation part 3A and the fixed part 2A. In the information device 12, a first sub-display screen 6A and a second sub-display screen 6B are provided on the surface of the fixed part 2A on both sides of the rotational movement mechanism 30 provided in the fixed part 2A.

In a state where the rotation part 3A overlaps with the fixed part 2A, the first pin 31 in the rotational movement mechanism 30 is positioned in a lower bottom portion of the first groove 21. Meanwhile, the second pin 32 is positioned at one of the ends of the second groove 22 in an energized state by a torsion spring 9 having one end attached to the fixed part 2A. Thus, the rotation part 3A does not rattle with respect to the fixed part 2A.

FIG. 11C illustrates a state where the right side of the rotation part 3A is lifted from the state illustrated in FIG. 11A and the rotation part 3A of the information device 12 is rotated counterclockwise (to the left). FIG. 11D illustrates a state of the rotational movement mechanism 30 in this event. A lower left end portion of the rotation part 3A is moved in a horizontal direction over the main body unit 1. In the middle of rotation of the rotation part 3A with respect to the fixed part 2A, the first pin 31 is lowered after being moved upward from the lower bottom portion to the upper bottom portion inside the first groove 21, and the second pin 32 is moved from one of the ends of the second groove 22 to the other end thereof. FIG. 11D illustrates the state where the first pin 31 is moved upward to the upper bottom portion of the first groove 21. The torsion spring 9 is compressed during the movement of the second pin 32 within the second groove 22.

FIG. 11E illustrates a state where the rotation part 3A is rotated to the left by 90° with respect to the fixed part 2A. In this state, the rotation part 3A is positioned right in the center of the fixed part 2A, and the first and second sub-display screens 6A and 6B appear on the both sides of the main display screen 96 in the rotation part 3A. Therefore, a user of the information device 12 may perform various operations using the left and right first and second sub-display screens 6A and 6B in addition to the main display screen 96.

In the state where the rotation part 3A is rotated to the left by 90° with respect to the fixed part 2A, as illustrated in FIG. 11F, the first pin 31 is in the position on its way back to the lower bottom portion from the upper bottom portion of the first groove 21, while the second pin 32 is positioned at the other end of the second groove 22. Also in the state where the second pin 32 is positioned at the other end of the second groove 22, the torsion spring 9 is in the compressed state and energizes the second pin 32 toward the other end of the second groove 22. Thus, the rotation part 3A does not rattle with respect to the fixed part 2A.

In the information device 12, when a speaker is disposed in a part of or the entire region of the first and second sub-display screens 6A and 6B, a speaker having a large opening area may be disposed. Therefore, the user of the information device 12 may listen to stereo music or voices with a high sound quality, which is output from the both sides of the main display screen 96.

Since the value of the offset amount u is 0, the rotation part 3A is positioned right in the center of the fixed part 2A when the rotation part 3A is rotated by 90° from the position overlapping with the fixed part 2A. When the value of the offset amount u is set to $-(a-b)/2 < u < 0$, the rotation part 3A is positioned at a position shifted to the left from the center of the fixed part 2A when the rotation part 3A is rotated by 90° from the position overlapping with the fixed part 2A. Therefore, the utilization mode of the first and second sub-display screens 6A and 6B may be set according to the use application.

The information device may have a configuration in which the display unit is hinge-connected to the main body unit. A portable information device (called tablet) is in widespread use, in which a display unit separates from a main body unit.

Figure 12A:
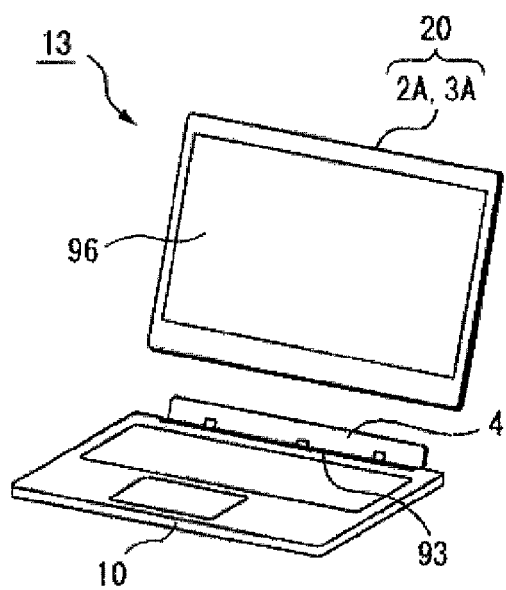
FIG. 12A illustrates an example of a perspective view of an information device.
Figure 12B:
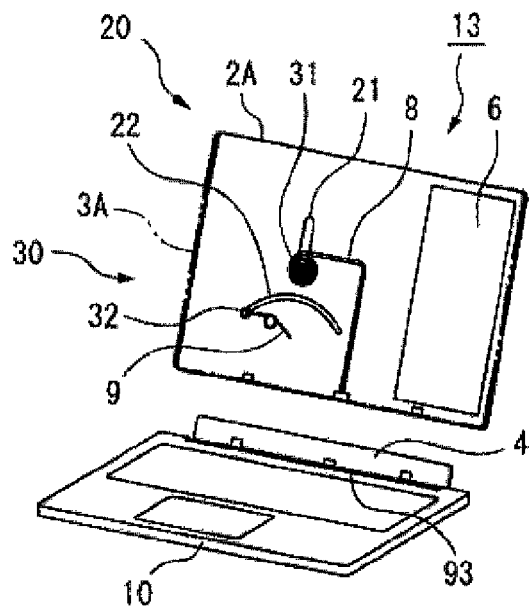
FIG. 12B illustrates an example of a perspective view from the front side of a rotational movement mechanism.
Figure 12C:
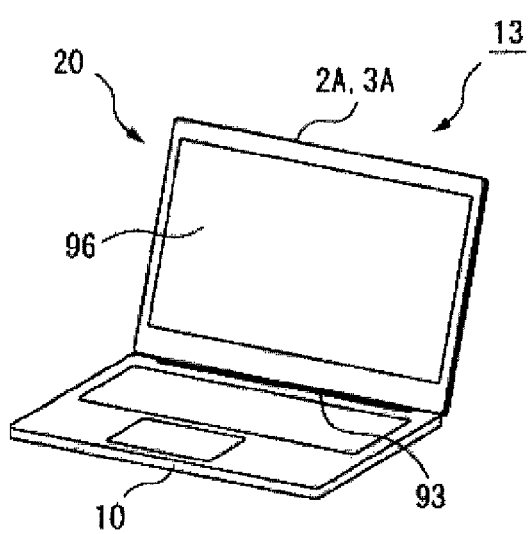
FIG. 12C illustrates an example of a perspective view of a portable information device.
Figure 12D:
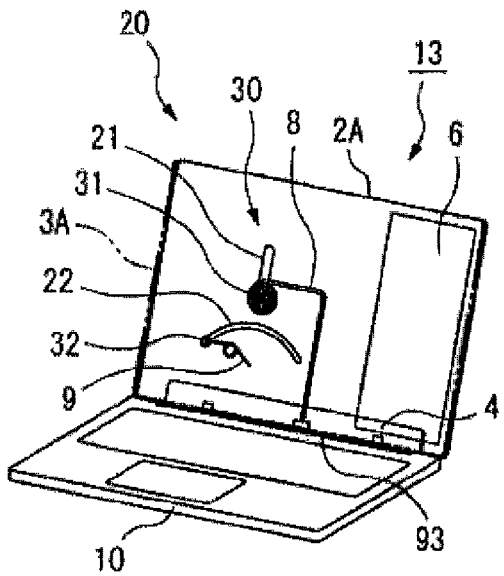
FIG. 12D illustrates an example of a perspective view from the front side of a rotational movement mechanism.
Figure 13A:
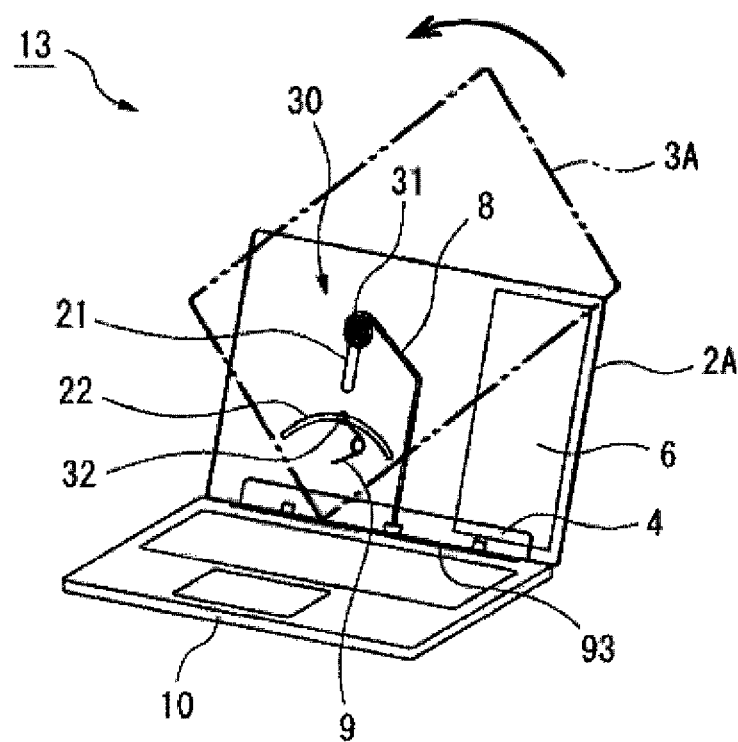
FIG. 13A illustrates an example of a perspective view from the front side of a screen magnifying device.
Figure 13B:
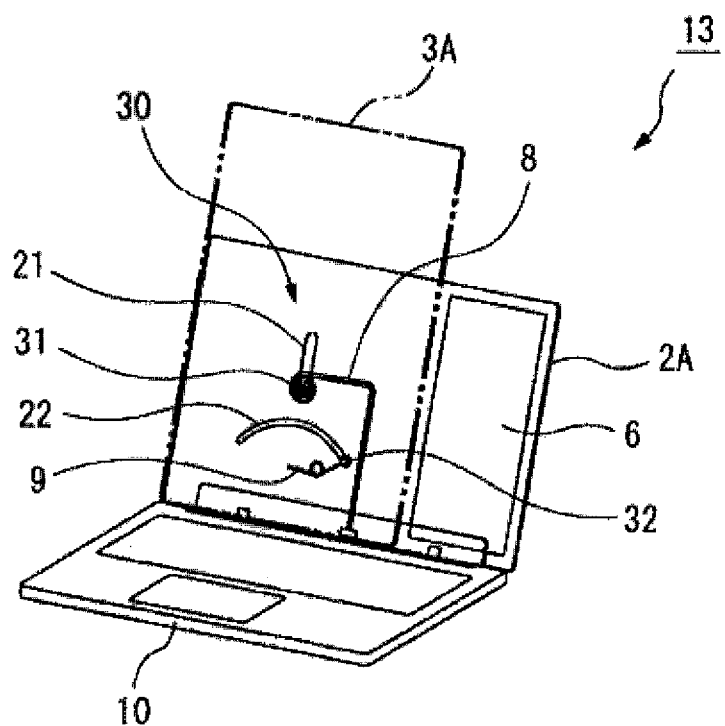
FIG. 13B illustrates an example of a perspective view from the front side of a rotational movement mechanism.

FIG. 12A illustrates an example of a perspective view of an information device. FIG. 12B illustrates an example of a perspective view from the front side of a rotational movement mechanism. FIG. 12C illustrates an example of a perspective view of a portable information device. FIG. 12D illustrates an example of a perspective view from the front side of a rotational movement mechanism. FIG. 12A illustrates a state before coupling a portable information device, in which a rotation part with a main display screen is overlapped with a fixed part, with an information device equipped with an expansion device with keyboard including a holder to fix the portable information device. FIG. 12B is a front perspective view of the rotational movement mechanism in the information device illustrated in FIG. 12A. FIG. 12C illustrates a state where the portable information device illustrated in FIG. 12A is fixed to the holder and coupled to the expansion device with keyboard. FIG. 12D is a front perspective view of the rotational movement mechanism of the information device illustrated in FIG. 12C. FIG. 13A illustrates an example of a perspective view from the front side of a screen magnifying device. FIG. 13B illustrates an example of a perspective view from the front side of a rotational movement mechanism. FIG. 13A is a front perspective view of the screen magnifying device in a state where the rotation part is being rotated to the left with respect to the fixed part by the rotational movement mechanism from the state illustrated in FIG. 12C. FIG. 13B is a front perspective view of the rotational movement mechanism in a state where the rotation part of the information device illustrated in FIG. 13A has finished its rotation to the left with respect to the fixed part by the rotational movement mechanism. FIG. 12A illustrates a portable information device 20, in which a fixed part 2A and a rotation part 3A with a main display screen 96 overlap with each other, and an information device 13 equipped with an expansion device 10 with keyboard, which expands the functions through connection to the portable information device 20. In the information device 13, the expansion device 10 with keyboard may correspond to the main body unit 1 illustrated in FIGS. 2A and 2B or FIGS. 11A to 11F. The portable information device 20 may correspond to the display unit 2 illustrated in FIGS. 2A and 2B or FIGS. 11A to 11F. In the connection between the expansion device 10 with keyboard and the portable information device 20, a holder 4 to attach the portable information device 20 and a hinge mechanism 93 to rotate the portable information device 20 coupled to the holder 4 are disposed.

Between the fixed part 2A and the rotation part 3A in the portable information device 20, a rotational movement mechanism 30 is provided, as illustrated in FIG. 12B, which is substantially the same as or similar to the rotational movement mechanism 30 illustrated in FIGS. 2A and 2B. A sub-display screen 6 is provided in the fixed part 2A to the right side of the rotational movement mechanism 30.

FIG. 12C illustrates the information device 13 in a state where the portable information device 20 illustrated in FIG. 12A is fixed to the holder 4 and coupled to the expansion device 10 with keyboard. FIG. 12D illustrates the rotational movement mechanism 30 in the information device 13 illustrated in FIG. 12C. The information device 13 in the state where the portable information device 20 is coupled to the expansion device 10 with keyboard may include a structure that is substantially the same as or similar to that of the information device 11 illustrated in FIGS. 2A and 2B. Thus, as illustrated in FIGS. 13A and 13B, a rotation operation of the rotation part 3A with respect to the fixed part 2A in the information device 13 may be substantially the same as or similar to that of the rotation part 3A with respect to the fixed part 2A in the information device 11 illustrated in FIGS. 2A and 2B. FIGS. 13A and 13B illustrate the rotation operation of the rotation part 3A with respect to the fixed part 2A in the information device 13, together with an operation of the rotational movement mechanism 30.

Figure 14A:
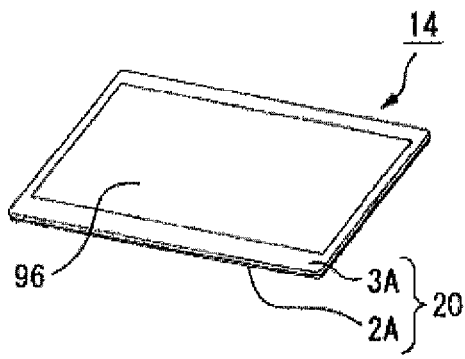
FIG. 14A illustrates an example of a perspective view of a information device.
Figure 14B:
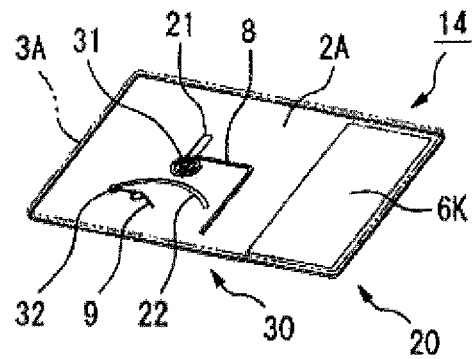
FIG. 14B illustrates an example of a perspective view from a main display screen side of a rotational movement mechanism.
Figure 14C:
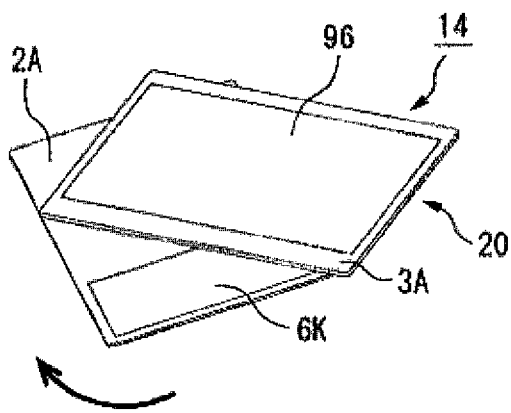
FIG. 14C illustrates an example of a perspective view of a sub-display screen.
Figure 14D:
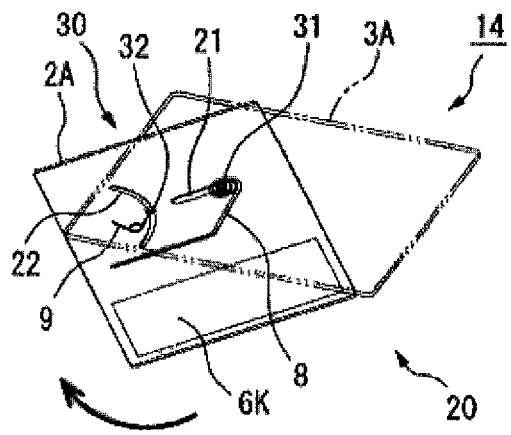
FIG. 14D illustrates an example of a perspective view from a main display screen side of a rotational movement mechanism.
Figure 14E:
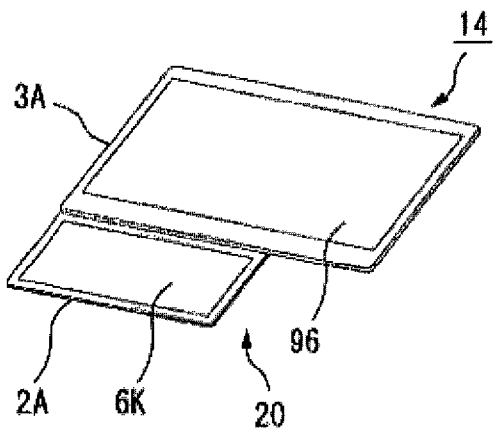
FIG. 14E illustrates an example of a perspective view of a sub-display screen.
Figure 14F:
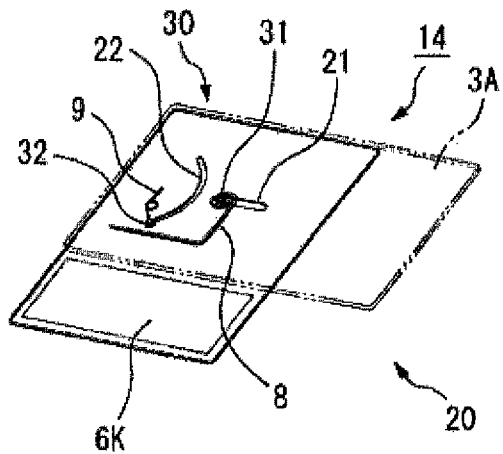
FIG. 14F illustrates an example of a perspective view from a main display screen side of an information device.

FIG. 14A illustrates an example of a perspective view of an information device. FIG. 14B illustrates an example of a perspective view from a main display screen side of a rotational movement mechanism. FIG. 14C illustrates an example of a perspective view of a sub-display screen. FIG. 14D illustrates an example of a perspective view from a main display screen side of a rotational movement mechanism. FIG. 14E illustrates an example of a perspective view of a sub-display screen. FIG. 14F illustrates an example of a perspective view from a main display screen side of a information device. FIG. 14A illustrates a tablet information device 14 in which a rotation part 3A with a main display screen 96 overlaps with a fixed part 2A. FIG. 14B illustrates a keyboard 6K provided in a section of a rotational movement mechanism 30 and a sub-display screen in the tablet information device 14 illustrated in FIG. 14A. The keyboard 6K may be formed by placing a touch panel on a sub-display screen 6, or may be formed using an actual mechanism part.

The rotation part 3A illustrated in FIG. 14A is rotated as illustrated in FIGS. 14C and 14E with respect to the fixed part 2A. FIGS. 14D and 14F illustrate the operation of the rotational movement mechanism 30 in this event. FIG. 14C illustrates a state where the sub-display screen is being rotated to the right with respect to the main display screen by the rotational movement mechanism from the state illustrated in FIG. 14A. FIG. 14D is a perspective view of the rotational movement mechanism illustrated in FIG. 14C from the main display screen side. FIG. 14E illustrates a state where the sub-display screen has finished its rotation to the right with respect to the main display screen by the rotational movement mechanism from the state illustrated in FIG. 14C. FIG. 14F is a perspective view of the tablet information device illustrated in FIG. 14E from the main display screen side. The rotation operation of the rotation part 3A with respect to the fixed part 2A and the operation of the rotational movement mechanism 30 may be the same as those described above. Therefore, the same components may be denoted by the same reference numerals, and description of operations may be omitted or reduced. In the information device 14, when the rotation part 3A is rotated by 90° with respect to the fixed part 2A, the keyboard 6K provided in the fixed part 2A appears below the horizontally long main display screen 96 in the rotation part 3A.

In the tablet information device, characters are input by a tap operation on the keyboard displayed on the horizontally long main display screen. However, good operability may not be achieved when inputting many characters. In the information device 14, a mechanical keyboard is used as the keyboard 6K, for example, and, when the rotation part 3A is rotated by 90°, the mechanical keyboard 6K provided in the fixed part 2A is exposed below the main display screen 96 in the rotation part 3A. Therefore, in the information device 14, characters are input using the keyboard 6K with the same operational feeling as that in the case of inputting characters with a normal laptop computer. Thus, the operability may be improved.

Figure 15A:
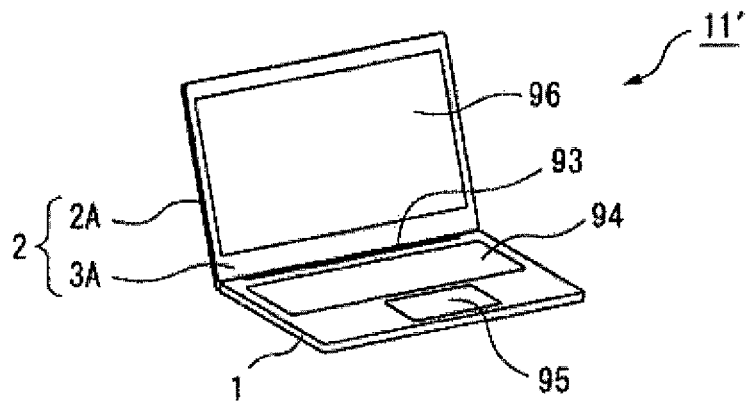
FIG. 15A illustrates an example of an assembly perspective view from a main display screen side of an information device.
Figure 15B:
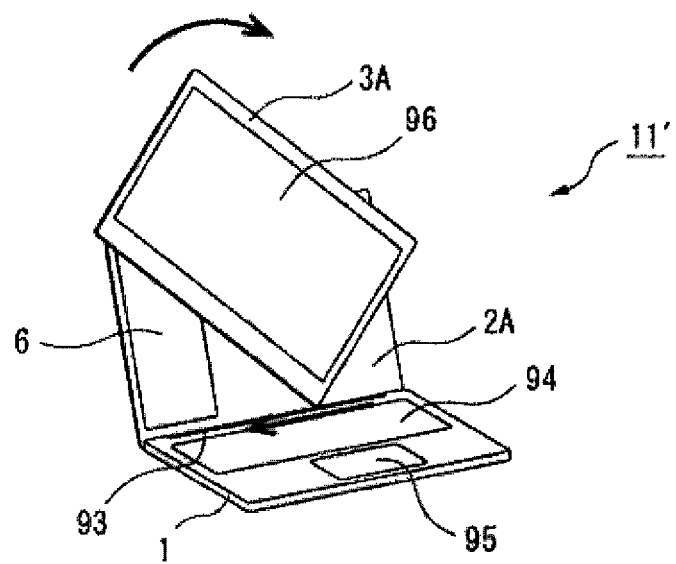
FIG. 15B illustrates an example of a perspective view of a rotation part.
Figure 15C:
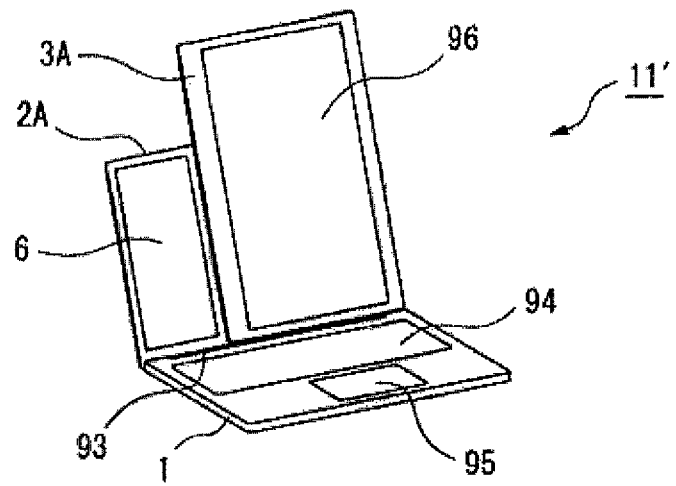
FIG. 15C illustrates an example of a perspective view of a rotation part.

The rotation part 3A may be rotated counterclockwise (to the left) or clockwise (to the right) with respect to the fixed part 2A by the rotational movement mechanism 30. FIG. 15A illustrates an example of an assembly perspective view from a main display screen side of an information device. FIG. 15B illustrates an example of a perspective view of a rotation part. FIG. 15C illustrates an example of a perspective view of the rotation part. FIG. 15A illustrates an information device from the main display screen side, the information device including a rotation part with a main display screen and a fixed part with a sub-display screen. FIG. 15B illustrates a state where the rotation part in the information device illustrated in FIG. 15A is being rotated to the right with respect to the fixed part by the rotational movement mechanism. FIG. 15C illustrates a state where the rotation part in the information device illustrated in FIG. 15B has finished its rotation to the right with respect to the fixed part by the rotational movement mechanism. FIGS. 15A to 15C illustrate an information device 11' obtained by modifying the information device 11 illustrated in FIGS. 2A and 2B. In the information device 11', an offset direction of the rotational movement mechanism 30 with respect to the center line of the rotation part 3A and the fixed part 2A is opposite to that in the information device 11 illustrated in FIGS. 2A and 2B. Therefore, in the information device 11', the rotation part 3A is rotated clockwise with respect to the fixed part 2A, as illustrated in FIGS. 15B and 15C.

When the rotation part 3A is rotated counterclockwise or clockwise with respect to the fixed part 2A by the rotational movement mechanism 30, the display area may be increased by switching the main display screen 96 in the rotation part 3A from a horizontally long screen to a vertically long screen. In the information device in which the display unit is opened and closed with respect to the main body unit, the display unit is configured to have a two-layer structure including the main display screen in the first layer and the sub-display screen in the second layer, and the sub-display screen is exposed even when the main display screen is slid in a vertical or horizontal direction. As for a vertical movement mechanism or a horizontal movement mechanism, the existing mechanism may be adopted.

Figure 16A:
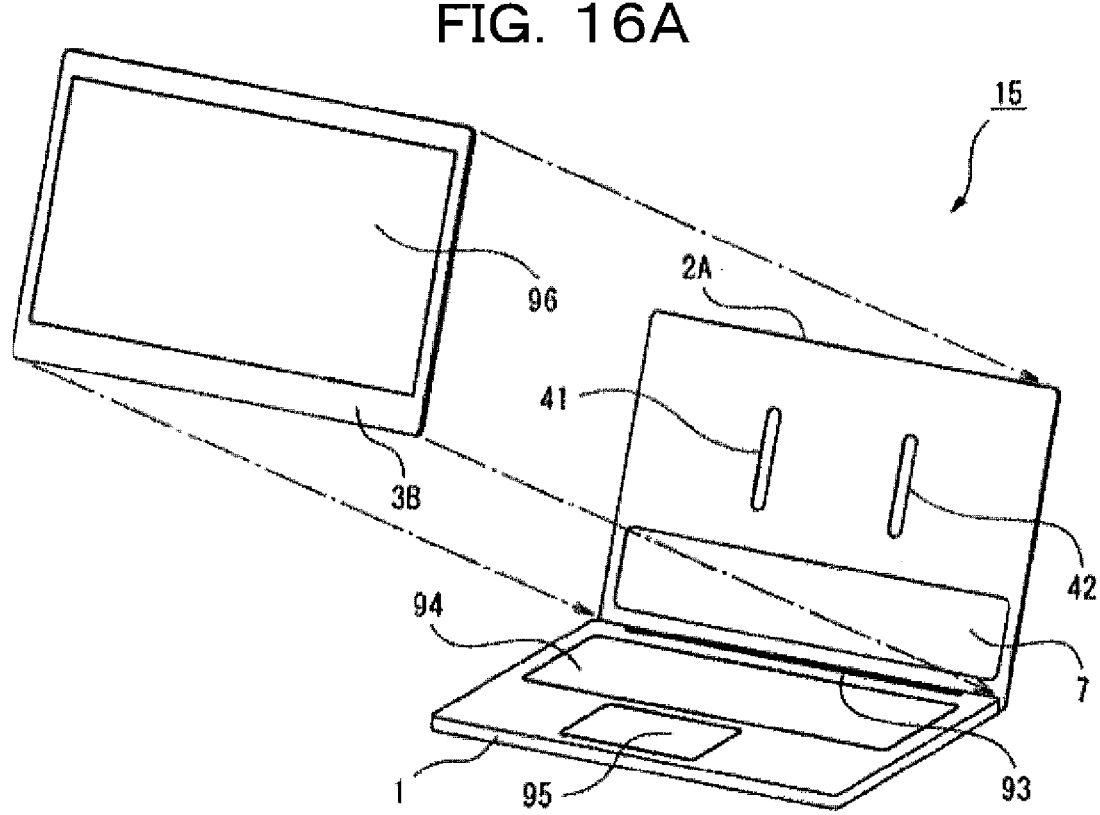
FIG. 16A illustrates an example of an assembly perspective view from a main display screen side of an information device.
Figure 16B:
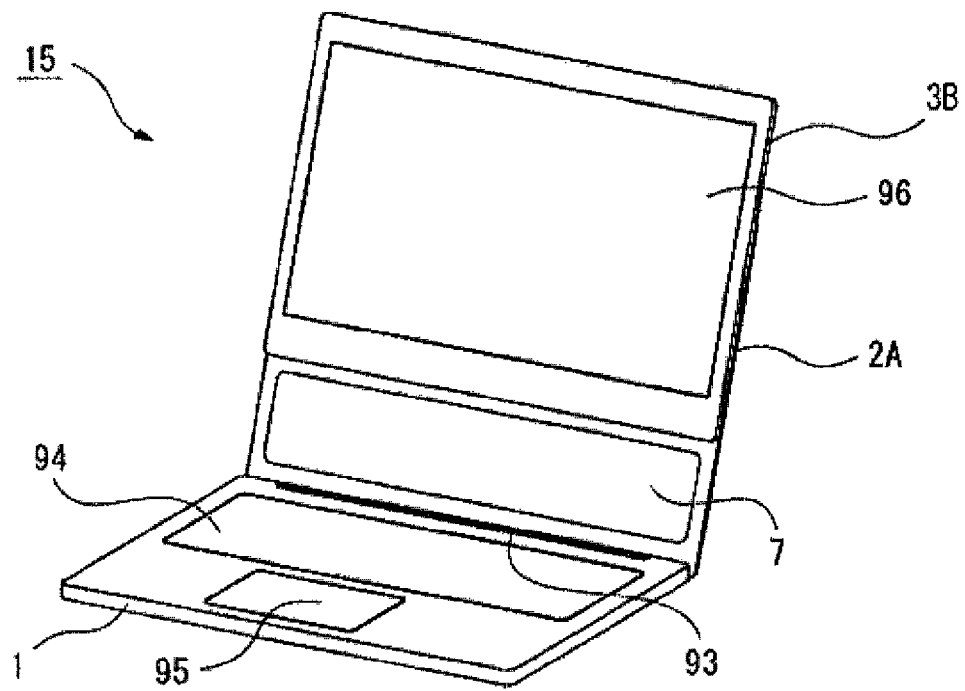
FIG. 16B illustrates an example of a perspective view of a movable part.

FIG. 16A illustrates an example of an assembly perspective view from a main display screen side of an information device. FIG. 16B illustrates an example of a perspective view of a movable part. FIG. 16A illustrates an information device 15 including a movable part 3B with a main display screen 96 and a fixed part 2A with a sub-display screen 7. In the fixed part 2A, two parallel first and second vertical grooves 41 and 42 are provided. The movable part 3B may be slidably moved with respect to the fixed part 2A by inserting two pins provided so as to protrude on the back of the movable part 3B into the first and second vertical grooves 41 and 42. The sub-display screen 7 may be formed to have substantially the same width as that of the main display screen 96 in the width direction of the fixed part 2A on the side of the hinge mechanism 93 in the fixed part 2A.

FIG. 16B illustrates a state where the movable part 3B illustrated in FIG. 16A is slid upward with respect to the fixed part 2A by the vertical movement mechanism. When the movable part 3B is slid upward with respect to the fixed part 2A, the sub-display screen 7 appears in the fixed part 2A between the main body unit 1 and the movable part 3B. Thus, when the sub-display screen 7 is a liquid crystal display screen, a vertically long content may be displayed using the main display screen 96 and the sub-display screen 7.

Figure 17A:
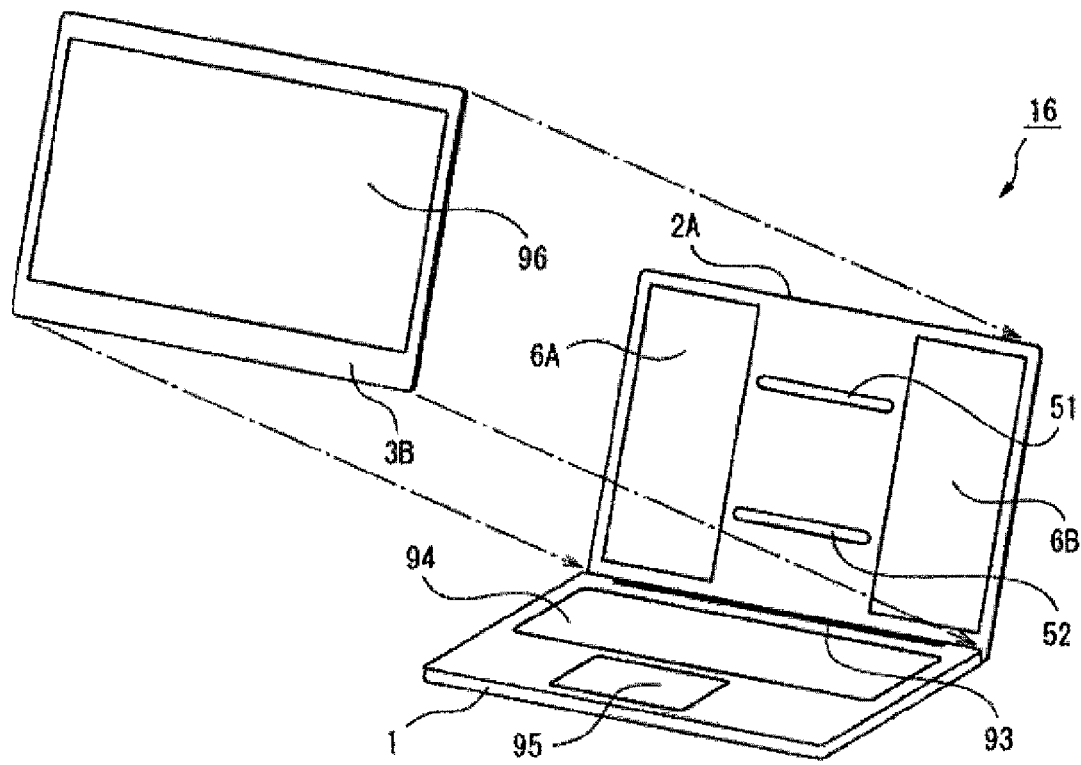
FIG. 17A illustrates an example of an assembly perspective view from a main display screen side of an information device.
Figures 17B, 17C:
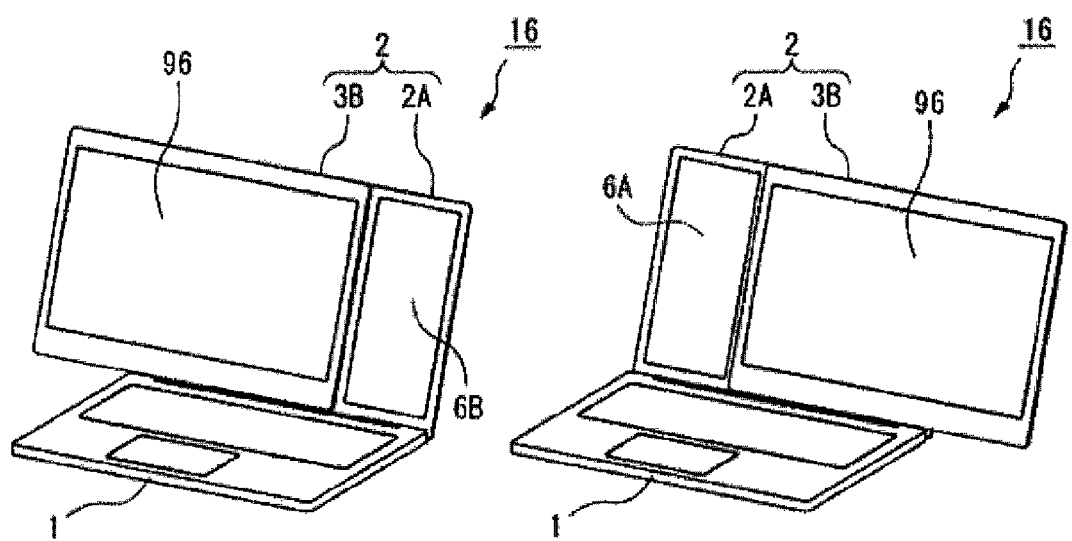
FIG. 17B illustrates an example of a perspective view of a movable part.
FIG. 17C illustrates an example of a perspective view of a movable part.

FIG. 17A illustrates an example of an assembly perspective view from a main display screen side of an information device. FIG. 17B illustrates an example of a perspective view of a movable part. FIG. 17C illustrates an example of a perspective view of a movable part. FIG. 17A illustrates an information device 16 including a movable part 3B with a main display screen 96 and a fixed part 2A with a sub-display screen 7. In the fixed part 2A, two parallel first and second horizontal grooves 51 and 52 are provided. The movable part 3B may be slidably moved with respect to the fixed part 2A by inserting two pins provided so as to protrude on the back of the movable part 3B into the first and second horizontal grooves 51 and 52. In the fixed part 2A, two sub-display screens 6A and 6B may be formed on both sides of the first and second horizontal grooves 51 and 52 so as to have substantially the same width as the length of the first and second horizontal grooves 51 and 52 and to have substantially the same height as that of the main display screen 96.

FIG. 17B illustrates a state where the movable part 3B illustrated in FIG. 17A is slid to the left with respect to the fixed part 2A by the horizontal movement mechanism. When the movable part 3B is slid to the left with respect to the fixed part 2A, the second sub-display screen 6B appears in the fixed part 2A on the right side of the movable part 3B. FIG. 17C illustrates a state where the movable part 3B illustrated in FIG. 17A is slid to the right with respect to the fixed part 2A by the horizontal movement mechanism. When the movable part 3B is slid to the right with respect to the fixed part 2A, the first sub-display screen 6A appears in the fixed part 2A on the left side of the movable part 3B. When the sub-display screens 6A and 6B are liquid crystal display screens, display using the sub-display screens 6A and 6B is performed, in addition to the display using the main display screen 96. Therefore, a horizontally long content having an aspect ratio larger than 9:16 may be displayed without scrolling.

An electric circuit inside the fixed part 2A and an electric circuit inside the rotation part 3A may be coupled through a cable 8. A short-distance radio communication device may be provided in each of the fixed part 2A and the rotation part 3A, and data generated in the electric circuit inside the fixed part 2A and data generated in the electric circuit inside the rotation part 3A may be exchanged wirelessly through data communication. In this case, the cable 8 is omitted.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information device comprising:
  a first housing and a second housing coupled through a hinge mechanism, the second housing being openable to an angle from a closed state where the second housing overlaps with the first housing;
  a third housing attached to a surface of the second housing on a first housing side through a movement mechanism capable of moving the third housing with respect to the second housing from an overlapped state with the second housing;
  a first display screen provided on a surface of the third housing on the first housing side; and
  at least one unit selected from a group of a second display screen, an input mechanism, an output mechanism and an input-output mechanism, provided on the surface of the second housing on the first housing side, the surface being exposed when the third housing is moved with respect to the second housing in a state where the second housing is opened with respect to the first housing.

2. The information device according to claim 1, wherein the movement mechanism includes a rotational movement mechanism configured to rotate the third housing with respect to the second housing.

3. The information device according to claim 2, wherein a long side of the first housing and a long side of the second housing are hinge-coupled, and
  an upper long side of the third housing overlaps with one of short sides of the second housing after a completion of a rotational movement of the third housing by the rotational movement mechanism.

4. The information device according to claim 1, wherein the second housing is separably hinge-coupled with the first housing in the hinge mechanism, and
  the second housing is capable of being used in a separated state from the first housing.

5. The information device according to claim 2, wherein the rotational movement mechanism includes:
  a first pin and a second pin provided so as to protrude from the third housing toward the second housing;
  a first groove, provided in the second housing, configured to receive and slide the first pin; and
  a second groove, provided in the second housing, configured to receive and slide the second pin.

6. The information device according to claim 5, wherein the first groove is a linear groove at a position offset to one of sides with respect to a center line of the second housing,
  the second groove, provided closer to the hinge mechanism than the first groove, configured to have a curved shape and be symmetrical to the center line of the first groove,
  in a state where the third housing overlaps with the second housing, the first pin is positioned in a lower bottom portion of the first groove, and the second pin is positioned at one end of the second groove, in a state where the third housing is being rotated with respect to the second housing, the first pin moves back and forth inside the first groove, and the second pin moves toward the other end of the second groove, and in a state where the rotation of the third housing with respect to the second housing is completed, the first pin is positioned in the lower bottom portion of the first groove, and the second pin is positioned at the other end of the second groove.

7. The information device according to claim 2, wherein a long side of the first housing and a long side of the second housing are hinge-coupled, one of short sides of the third housing overlaps with an intermediate portion of the long side of the second housing after a completion of a rotational movement of the third housing by the rotational movement mechanism, and the surface of the second housing on the first housing side is exposed on both sides of the third housing.

8. The information device according to claim 5, wherein the first groove is a linear groove at a position of a center line of the second housing, the second groove, provided closer to the hinge mechanism than the first groove, configured to have a curved shape, in a state where the third housing overlaps with the second housing, the first pin is positioned in a lower bottom portion of the first groove, and the second pin is positioned at one end of the second groove, in a state where the third housing is being rotated with respect to the second housing, the first pin moves back and forth inside the first groove, and the second pin moves toward the other end of the second groove, and in a state where the rotation of the third housing with respect to the second housing is completed, the first pin is positioned between the lower bottom portion and an upper bottom portion of the first groove, and the second pin is positioned at the other end of the second groove.

9. The information device according to claim 6, wherein the second groove is an elliptic groove.

10. The information device according to claim 6, wherein a torsion spring is provided between the second pin and the second housing, the torsion spring being configured to energize the second pin toward one of the ends of the second groove.

11. The information device according to claim 1, wherein the movement mechanism includes a vertical movement mechanism configured to slidably move the third housing with respect to the second housing, a long side of the first housing and a long side of the second housing are hinge-coupled, and the third housing is capable of moving upward, in a state where a long side of the third housing is parallel to the long side of the second housing, with respect to the second housing by the vertical movement mechanism.

12. The information device according to claim 5, wherein the first and second grooves are linear grooves at positions symmetrical to the center line of the second housing, in a state where the third housing overlaps with the second housing, the first and second pins are positioned in lower bottom portions of the first and second grooves, and in a state where upward movement of the third housing with respect to the second housing is completed, the first and second pins are positioned in upper bottom portions of the first and second grooves.

13. The information device according to claim 12, wherein a torsion spring is provided between the first and second pins and the second housing, the torsion spring being configured to energize the first and second pins toward one of the bottom portions of the first and second grooves.

14. The information device according to claim 1, wherein the movement mechanism includes a horizontal movement mechanism configured to slidably move the third housing with respect to the second housing, a long side of the first housing and a long side of the second housing are hinge-coupled, and the third housing is capable of horizontally moving, in a state where a short side of the third housing is parallel to a short side of the second housing, with respect to the second housing by the horizontal movement mechanism.

15. The information device according to claim 14, wherein the horizontal movement mechanism includes:

at least one pin provided so as to protrude from the third housing toward the second housing and at least one groove, provided in the second housing, configured to receive and slide the at least one pin, the groove being, wherein the at least one groove is a linear groove parallel to the long side of the second housing, in a state where the third housing overlaps with the second housing, the at least one pin is positioned one of the ends of the at least one groove, and in a state where the horizontal movement of the third housing with respect to the second housing is completed, the at least one pin is positioned at the other end of the at least one groove.

16. The information device according to claim 15, wherein a torsion spring is provided between the at least one pin and the second housing, the torsion spring being configured to energize the at least one pin toward one of the ends of the at least one groove.

17. The information device according to claim 6, wherein a through-hole is provided in the first pin or the at least one pin, the through-hole being provided in an axis direction of the first pin or the at least one pin, and a cable, which couples an electric circuit in the second housing with an electric circuit in the third housing, is inserted into the through-hole.

18. The information device according to claim 17, wherein the cable inserted into the through-hole in the first pin is wound a number of times inside the second housing so as to buffer the rotation force of the first pin with respect to the second housing along with the rotation of the third housing.

19. The information device according to claim 1, wherein each of the second and third housings includes a short-distance radio communication device configured to wirelessly exchange data generated in the electric circuit in the second housing and data generated in the electric circuit in the third housing through data communication.

20. The information device according to claim 1, wherein when the input mechanism is provided as the unit, the input mechanism is one of a keyboard, a touch pad, and an electromagnetic guidance digitizer, when the output mechanism is provided as the unit, the output mechanism is a sub-display screen or a speaker, and when the input-output mechanism is provided as the unit, the input-output mechanism is a sub-display screen with a touch panel or a connection unit with a portable device.

* * * * *